US006993153B2

(12) United States Patent
Bradley

(10) Patent No.: US 6,993,153 B2
(45) Date of Patent: *Jan. 31, 2006

(54) SELF-ORIENTING WATERMARKS

(75) Inventor: Brett A. Bradley, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/669,310

(22) Filed: Sep. 23, 2003

(65) Prior Publication Data

US 2004/0057598 A1 Mar. 25, 2004

Related U.S. Application Data

(63) Continuation of application No. 09/502,543, filed on Feb. 10, 2000, now Pat. No. 6,625,297.

(51) Int. Cl.
*G06K 9/00* (2006.01)

(52) U.S. Cl. ............................ 382/100; 380/28; 380/38; 380/54; 380/232; 382/191; 382/210; 382/232

(58) Field of Classification Search ................ 156/378; 358/475; 380/232, 28, 31, 38, 54; 382/100, 382/112, 115, 135, 212, 232

See application file for complete search history.

(56) References Cited

U.S. PATENT DOCUMENTS 3,493,674 A   2/1970   Houghton
3,569,619 A   3/1971   Simjian
3,576,369 A   4/1971   Wick et al.

(Continued)

FOREIGN PATENT DOCUMENTS

| CA | 2235002  | 12/1998 |
| DE | 3806411  | 9/1989  |
| DE | 19521969 | 2/1997  |

(Continued)

OTHER PUBLICATIONS

U.S. Appl. No. 60/000,442, filed Jun. 20, 1995, Hudetz.
U.S. Appl. No. 60/071,983, filed Jan. 20, 1998, Levy.
U.S. Appl. No. 60/082,228, filed Apr. 16, 1998, Rhoads.

(Continued)

*Primary Examiner*—Bhavesh M. Mehta
*Assistant Examiner*—Gregory Desire
(74) *Attorney, Agent, or Firm*—Digimarc Corporation

(57) ABSTRACT

A watermarking method converts a watermark message into a Frequency Shift Keying (FSK) signal and embeds the FSK signal in a host signal. The spectral properties of the FSK watermark signal facilitate its detection, even in applications where the watermarked signal is corrupted. Because of these properties, the FSK watermark signal can perform the dual function of identifying the watermark's presence and orientation in potentially corrupted media, and also conveying a hidden message in the host signal. Such a watermark may be referred to as a self-orienting watermark.

20 Claims, 6 Drawing Sheets

U.S. PATENT DOCUMENTS

| | | |
|---|---|---|
| 3,585,290 A | 6/1971 | Sanford |
| 3,655,162 A | 4/1972 | Yamamoto et al. |
| 3,703,628 A | 11/1972 | Philipson, Jr. |
| 3,809,806 A | 5/1974 | Walker et al. |
| 3,838,444 A | 9/1974 | Loughlin et al. |
| 3,845,391 A | 10/1974 | Crosby |
| 3,914,877 A | 10/1975 | Hines |
| 3,922,074 A | 11/1975 | Ikegami et al. |
| 3,971,917 A | 7/1976 | Maddox et al. |
| 3,977,785 A | 8/1976 | Harris |
| 3,982,064 A | 9/1976 | Barnaby |
| 3,984,624 A | 10/1976 | Waggener |
| 4,025,851 A | 5/1977 | Haselwood et al. |
| 4,038,596 A | 7/1977 | Lee |
| 4,081,132 A | 3/1978 | Pearce |
| 4,081,831 A | 3/1978 | Tang et al. |
| 4,184,700 A | 1/1980 | Greenaway |
| 4,186,944 A | 2/1980 | Pearce |
| 4,225,967 A | 9/1980 | Miwa et al. |
| 4,230,990 A | 10/1980 | Lert, Jr. et al. |
| 4,231,113 A | 10/1980 | Blasbalg |
| 4,238,849 A | 12/1980 | Gassmann |
| 4,252,995 A | 2/1981 | Schmidt et al. |
| 4,262,329 A | 4/1981 | Bright et al. |
| 4,296,326 A | 10/1981 | Haslop et al. |
| 4,297,729 A | 10/1981 | Steynor et al. |
| 4,313,197 A | 1/1982 | Maxemchuk |
| 4,367,488 A | 1/1983 | Leventer et al. |
| 4,379,947 A | 4/1983 | Warner |
| 4,380,027 A | 4/1983 | Leventer et al. |
| 4,389,671 A | 6/1983 | Posner et al. |
| 4,395,600 A | 7/1983 | Lundy et al. |
| 4,416,001 A | 11/1983 | Ackerman et al. |
| 4,420,829 A | 12/1983 | Carlson |
| 4,423,415 A | 12/1983 | Goldman |
| 4,425,642 A | 1/1984 | Moses et al. |
| 4,476,468 A | 10/1984 | Goldman |
| 4,528,588 A | 7/1985 | Lofberg |
| 4,532,508 A | 7/1985 | Ruell |
| 4,547,804 A | 10/1985 | Greenberg |
| 4,553,261 A | 11/1985 | Froessl |
| 4,590,366 A | 5/1986 | Rothfjell |
| 4,595,950 A | 6/1986 | Lofberg |
| 4,618,257 A | 10/1986 | Bayne et al. |
| 4,637,051 A | 1/1987 | Clark |
| 4,639,779 A | 1/1987 | Greenberg |
| 4,647,974 A | 3/1987 | Butler et al. |
| 4,654,867 A | 3/1987 | Labedz et al. |
| 4,660,221 A | 4/1987 | Dlugos |
| 4,663,518 A | 5/1987 | Borror et al. |
| 4,665,431 A | 5/1987 | Cooper |
| 4,672,605 A | 6/1987 | Hustig et al. |
| 4,675,746 A | 6/1987 | Tetrick et al. |
| 4,677,435 A | 6/1987 | Cause D'Agraives et al. |
| 4,682,794 A | 7/1987 | Margolin |
| 4,703,476 A | 10/1987 | Howard |
| 4,712,103 A | 12/1987 | Gotanda |
| 4,718,106 A | 1/1988 | Weinblatt |
| 4,723,149 A | 2/1988 | Harada |
| 4,739,377 A | 4/1988 | Allen |
| 4,750,173 A | 6/1988 | Bluthgen |
| 4,765,656 A | 8/1988 | Becker et al. |
| 4,775,901 A | 10/1988 | Nakano |
| 4,776,013 A | 10/1988 | Kafri et al. |
| 4,805,020 A | 2/1989 | Greenberg |
| 4,807,031 A | 2/1989 | Broughton et al. |
| 4,811,357 A | 3/1989 | Betts et al. |
| 4,811,408 A | 3/1989 | Goldman |
| 4,820,912 A | 4/1989 | Samyn |
| 4,835,517 A | 5/1989 | van der Gracht et al. |
| 4,855,827 A | 8/1989 | Best |
| 4,864,618 A | 9/1989 | Wright et al. |
| 4,866,771 A | 9/1989 | Bain |
| 4,874,936 A | 10/1989 | Chandler et al. |
| 4,876,617 A | 10/1989 | Best et al. |
| 4,879,747 A | 11/1989 | Leighton et al. |
| 4,884,139 A | 11/1989 | Pommier |
| 4,885,632 A | 12/1989 | Mabey et al. |
| 4,888,798 A | 12/1989 | Earnest |
| 4,903,301 A | 2/1990 | Kondo et al. |
| 4,908,836 A | 3/1990 | Rushforth et al. |
| 4,908,873 A | 3/1990 | Philibert et al. |
| 4,918,484 A | 4/1990 | Ujiie et al. |
| 4,920,503 A | 4/1990 | Cook |
| 4,921,278 A | 5/1990 | Shiang et al. |
| 4,939,515 A | 7/1990 | Adelson |
| 4,941,150 A | 7/1990 | Iwasaki |
| 4,943,973 A | 7/1990 | Werner |
| 4,943,976 A | 7/1990 | Ishigaki |
| 4,944,036 A | 7/1990 | Hyatt |
| 4,945,412 A | 7/1990 | Kramer |
| 4,947,028 A | 8/1990 | Gorog |
| 4,963,998 A | 10/1990 | Maufe |
| 4,965,827 A | 10/1990 | McDonald |
| 4,967,273 A | 10/1990 | Greenberg |
| 4,969,041 A | 11/1990 | O'Grady et al. |
| 4,972,471 A | 11/1990 | Gross et al. |
| 4,972,475 A | 11/1990 | Sant'Anselmo |
| 4,972,476 A | 11/1990 | Nathans |
| 4,977,594 A | 12/1990 | Shear |
| 4,979,210 A | 12/1990 | Nagata et al. |
| 4,996,530 A | 2/1991 | Hilton |
| 5,003,590 A | 3/1991 | Lechner et al. |
| 5,010,405 A | 4/1991 | Schreiber et al. |
| 5,023,907 A | 6/1991 | Johnson |
| 5,027,401 A | 6/1991 | Soltesz |
| 5,034,982 A | 7/1991 | Heninger et al. |
| 5,036,513 A | 7/1991 | Greenblatt |
| 5,040,059 A | 8/1991 | Leberl |
| 5,053,956 A | 10/1991 | Donald |
| 5,062,666 A | 11/1991 | Mowry et al. |
| 5,063,446 A | 11/1991 | Gibson |
| 5,073,899 A | 12/1991 | Collier et al. |
| 5,073,925 A | 12/1991 | Nagata et al. |
| 5,075,773 A | 12/1991 | Pullen et al. |
| 5,077,608 A | 12/1991 | Dubner |
| 5,077,795 A | 12/1991 | Rourke et al. |
| 5,079,648 A | 1/1992 | Maufe |
| 5,091,966 A | 2/1992 | Bloomberg et al. |
| 5,095,196 A | 3/1992 | Miyata |
| 5,103,459 A | 4/1992 | Gilhousen et al. |
| 5,113,437 A | 5/1992 | Best |
| 5,113,445 A | 5/1992 | Wang |
| 5,128,525 A | 7/1992 | Stearns et al. |
| 5,144,660 A | 9/1992 | Rose |
| 5,146,457 A | 9/1992 | Veldhuis et al. |
| 5,148,498 A | 9/1992 | Resnikoff et al. |
| 5,150,409 A | 9/1992 | Elsner |
| 5,161,210 A | 11/1992 | Druyvesteyn et al. |
| 5,166,676 A | 11/1992 | Milheiser |
| 5,168,147 A | 12/1992 | Bloomberg |
| 5,181,786 A | 1/1993 | Hujink |
| 5,185,736 A | 2/1993 | Tyrrell et al. |
| 5,199,081 A | 3/1993 | Saito et al. |
| 5,200,822 A | 4/1993 | Bronfin et al. |
| 5,212,551 A | 5/1993 | Conanan |
| 5,213,337 A | 5/1993 | Sherman |
| 5,216,724 A | 6/1993 | Suzuki et al. |
| 5,228,056 A | 7/1993 | Schilling |
| 5,235,619 A | 8/1993 | Beyers et al. |
| 5,243,411 A | 9/1993 | Shirochi et al. |

| | | | | | |
|---|---|---|---|---|---|
| 5,243,423 A | 9/1993 | DeJean et al. | 5,539,735 A | 7/1996 | Moskowitz |
| 5,245,165 A | 9/1993 | Zhang | 5,541,662 A | 7/1996 | Adams et al. |
| 5,245,329 A | 9/1993 | Gokcebay | 5,544,255 A | 8/1996 | Smithies et al. |
| 5,247,364 A | 9/1993 | Banker et al. | 5,548,646 A | 8/1996 | Aziz et al. |
| 5,253,078 A | 10/1993 | Balkanski et al. | 5,557,333 A | 9/1996 | Jungo et al. |
| 5,257,119 A | 10/1993 | Funada et al. | 5,559,559 A | 9/1996 | Jungo et al. |
| 5,259,025 A | 11/1993 | Monroe | 5,568,179 A | 10/1996 | Diehl et al. |
| 5,267,334 A | 11/1993 | Normille et al. | 5,568,550 A | 10/1996 | Ur |
| 5,280,537 A | 1/1994 | Sugiyama et al. | 5,568,570 A | 10/1996 | Rabbani |
| 5,288,976 A | 2/1994 | Citron | 5,572,010 A | 11/1996 | Petrie |
| 5,291,243 A | 3/1994 | Heckman et al. | 5,572,247 A | 11/1996 | Montgomery |
| 5,293,399 A | 3/1994 | Hefti | 5,576,532 A | 11/1996 | Hecht |
| 5,295,203 A | 3/1994 | Krause et al. | 5,579,124 A | 11/1996 | Aijala et al. |
| 5,299,019 A | 3/1994 | Pack et al. | 5,582,103 A | 12/1996 | Tanaka et al. |
| 5,305,400 A | 4/1994 | Butera | 5,587,743 A | 12/1996 | Montgomery |
| 5,315,098 A | 5/1994 | Tow | 5,590,197 A | 12/1996 | Chen et al. |
| 5,319,453 A | 6/1994 | Copriviza et al. | 5,594,226 A | 1/1997 | Steger |
| 5,319,724 A | 6/1994 | Blonstein et al. | 5,598,526 A | 1/1997 | Daniel et al. |
| 5,319,735 A | 6/1994 | Preuss et al. | 5,602,920 A | 2/1997 | Bestler et al. |
| 5,321,470 A | 6/1994 | Hasuo et al. | 5,606,609 A | 2/1997 | Houser et al. |
| 5,325,167 A | 6/1994 | Melen | 5,611,575 A | 3/1997 | Petrie |
| 5,327,237 A | 7/1994 | Gerdes et al. | 5,613,004 A | 3/1997 | Cooperman et al. |
| 5,337,361 A | 8/1994 | Wang et al. | 5,613,012 A | 3/1997 | Hoffman et al. |
| 5,337,362 A | 8/1994 | Gormish et al. | 5,614,940 A | 3/1997 | Cobbley et al. |
| 5,349,655 A | 9/1994 | Mann | 5,617,119 A | 4/1997 | Briggs et al. |
| 5,351,302 A | 9/1994 | Leighton et al. | 5,617,148 A | 4/1997 | Montgomery |
| 5,371,792 A | 12/1994 | Asai et al. | 5,629,770 A | 5/1997 | Brassil |
| 5,374,976 A | 12/1994 | Spannenburg | 5,629,980 A | 5/1997 | Stefik et al. |
| 5,379,345 A | 1/1995 | Greenberg | 5,636,292 A | 6/1997 | Rhoads |
| 5,387,941 A | 2/1995 | Montgomery et al. | 5,638,443 A | 6/1997 | Stefik |
| 5,394,274 A | 2/1995 | Kahn | 5,638,446 A | 6/1997 | Rubin |
| 5,396,559 A | 3/1995 | McGrew | 5,640,193 A | 6/1997 | Wellner |
| 5,398,283 A | 3/1995 | Virga | 5,646,999 A | 7/1997 | Saito |
| 5,404,160 A | 4/1995 | Schober et al. | 5,652,626 A | 7/1997 | Kawakami et al. |
| 5,404,377 A | 4/1995 | Moses | 5,659,164 A | 8/1997 | Schmid |
| 5,408,542 A | 4/1995 | Callahan | 5,661,574 A | 8/1997 | Kawana |
| 5,416,307 A | 5/1995 | Danek et al. | 5,663,766 A | 9/1997 | Sizer, II |
| 5,418,853 A | 5/1995 | Kanota et al. | 5,664,018 A | 9/1997 | Leighton |
| 5,422,963 A | 6/1995 | Chen et al. | 5,665,951 A | 9/1997 | Newman et al. |
| 5,422,995 A | 6/1995 | Aoki et al. | 5,666,487 A | 9/1997 | Goodman et al. |
| 5,425,100 A | 6/1995 | Thomas et al. | 5,668,636 A | 9/1997 | Beach et al. |
| 5,428,606 A | 6/1995 | Moskowitz | 5,671,282 A | 9/1997 | Wolff et al. |
| 5,428,607 A | 6/1995 | Hiller et al. | 5,673,316 A | 9/1997 | Auerbach et al. |
| 5,428,731 A | 6/1995 | Powers | 5,687,236 A | 11/1997 | Moskowitz et al. |
| 5,432,542 A | 7/1995 | Thibadeau et al. | 5,710,636 A | 1/1998 | Curry |
| 5,432,870 A | 7/1995 | Schwartz | 5,719,939 A | 2/1998 | Tel |
| 5,446,488 A | 8/1995 | Vogel | 5,721,788 A | 2/1998 | Powell et al. |
| 5,450,122 A | 9/1995 | Keene | 5,727,092 A | 3/1998 | Sandford, II et al. |
| 5,450,490 A | 9/1995 | Jensen et al. | 5,735,547 A | 4/1998 | Morelle et al. |
| 5,461,426 A | 10/1995 | Limberg et al. | 5,740,244 A | 4/1998 | Indeck et al. |
| 5,463,209 A | 10/1995 | Figh | 5,742,845 A | 4/1998 | Wagner |
| 5,469,222 A | 11/1995 | Sprague | 5,745,604 A | 4/1998 | Rhoads |
| 5,469,506 A | 11/1995 | Berson et al. | 5,761,686 A | 6/1998 | Bloomberg |
| 5,473,631 A | 12/1995 | Moses | 5,768,426 A | 6/1998 | Rhoads |
| 5,479,168 A | 12/1995 | Johnson et al. | 5,778,102 A | 7/1998 | Sandford, II et al. |
| 5,481,294 A | 1/1996 | Thomas et al. | 5,790,693 A | 8/1998 | Graves et al. |
| 5,488,664 A | 1/1996 | Shamir | 5,790,697 A | 8/1998 | Munro et al. |
| 5,493,677 A | 2/1996 | Bfalogh | 5,804,803 A | 9/1998 | Cragun et al. |
| 5,495,581 A | 2/1996 | Tsai | 5,809,139 A | 9/1998 | Girod et al. |
| 5,496,071 A | 3/1996 | Walsh | 5,809,160 A | 9/1998 | Powell et al. |
| 5,499,294 A | 3/1996 | Friedman | 5,809,317 A | 9/1998 | Kogan et al. |
| 5,502,576 A | 3/1996 | Ramsay et al. | 5,817,205 A | 10/1998 | Kaule |
| 5,515,081 A | 5/1996 | Vasilik | 5,818,441 A | 10/1998 | Throckmorton et al. |
| 5,521,722 A | 5/1996 | Colvill et al. | 5,819,289 A | 10/1998 | Sanford, II et al. |
| 5,524,933 A | 6/1996 | Kunt et al. | 5,825,871 A | 10/1998 | Mark |
| 5,530,751 A | 6/1996 | Morris | 5,825,892 A | 10/1998 | Braudaway et al. |
| 5,530,759 A | 6/1996 | Braudaway et al. | 5,838,458 A | 11/1998 | Tsai |
| 5,530,852 A | 6/1996 | Meske, Jr. et al. | 5,841,978 A | 11/1998 | Rhoads |
| 5,532,920 A | 7/1996 | Hartrick et al. | 5,848,144 A | 12/1998 | Ahrens |
| 5,537,223 A | 7/1996 | Curry | 5,848,413 A | 12/1998 | Wolff |
| 5,539,471 A | 7/1996 | Myhrvold et al. | 5,852,673 A | 12/1998 | Young |

| Patent No. | Date | Inventor |
|---|---|---|
| 5,857,038 A | 1/1999 | Owada et al. |
| 5,862,218 A | 1/1999 | Steinberg |
| 5,862,260 A | 1/1999 | Rhoads |
| 5,867,586 A | 2/1999 | Liang |
| 5,869,819 A | 2/1999 | Knowles et al. |
| 5,871,615 A | 2/1999 | Harris |
| 5,872,589 A | 2/1999 | Morales |
| 5,875,249 A | 2/1999 | Mintzer et al. |
| 5,893,101 A | 4/1999 | Balogh et al. |
| 5,898,779 A | 4/1999 | Squilla et al. |
| 5,900,608 A | 5/1999 | Iida |
| 5,901,178 A | 5/1999 | Lee et al. |
| 5,902,353 A | 5/1999 | Reber et al. |
| 5,903,729 A | 5/1999 | Reber et al. |
| 5,905,248 A | 5/1999 | Russell et al. |
| 5,905,251 A | 5/1999 | Knowles |
| 5,905,800 A * | 5/1999 | Moskowitz et al. .......... 380/28 |
| 5,905,810 A | 5/1999 | Jones et al. |
| 5,913,210 A | 6/1999 | Call |
| 5,915,027 A | 6/1999 | Cox et al. |
| 5,930,767 A | 7/1999 | Reber et al. |
| 5,932,863 A | 8/1999 | Rathus et al. |
| 5,933,798 A | 8/1999 | Linnartz |
| 5,933,829 A | 8/1999 | Durst et al. |
| 5,938,726 A | 8/1999 | Reber et al. |
| 5,938,727 A | 8/1999 | Ikeda |
| 5,939,695 A | 8/1999 | Nelson |
| 5,940,595 A | 8/1999 | Reber et al. |
| 5,944,608 A | 8/1999 | Reed et al. |
| 5,949,055 A | 9/1999 | Fleet et al. |
| 5,950,173 A | 9/1999 | Perkowski |
| 5,963,916 A | 10/1999 | Kaplan |
| 5,971,277 A | 10/1999 | Cragun et al. |
| 5,974,141 A | 10/1999 | Saito |
| 5,974,548 A | 10/1999 | Adams |
| 5,978,773 A | 11/1999 | Hudetz et al. |
| 5,979,757 A | 11/1999 | Tracy et al. |
| 5,983,218 A | 11/1999 | Syeda-Mahmood |
| 5,991,426 A | 11/1999 | Cox et al. |
| 6,005,501 A | 12/1999 | Wolosewicz |
| 6,005,605 A | 12/1999 | Kostreski et al. |
| 6,008,737 A | 12/1999 | Deluca et al. |
| 6,024,287 A | 2/2000 | Takai et al. |
| 6,035,177 A | 3/2000 | Moses et al. |
| 6,052,486 A | 4/2000 | Knowlton et al. |
| 6,064,764 A | 5/2000 | Bhaskaran et al. |
| 6,122,403 A | 9/2000 | Rhoads |
| 6,166,750 A | 12/2000 | Negishi |
| 6,188,787 B1 | 2/2001 | Ohmae et al. |
| 6,243,480 B1 | 6/2001 | Zhao et al. |
| 6,252,963 B1 | 6/2001 | Rhoads |
| 6,266,430 B1 | 7/2001 | Rhoads et al. |
| 6,285,776 B1 | 9/2001 | Rhoads |
| 6,301,360 B1 | 10/2001 | Bocionek et al. |
| 6,311,214 B1 | 10/2001 | Rhoads |
| 6,321,648 B1 | 11/2001 | Berson et al. |
| 6,321,981 B1 | 11/2001 | Ray et al. |
| 6,324,574 B1 | 11/2001 | Gong |
| 6,338,037 B1 | 1/2002 | Todd et al. |
| 6,343,138 B1 | 1/2002 | Rhoads |
| 6,343,204 B1 | 1/2002 | Yang |
| 6,345,104 B1 | 2/2002 | Rhoads |
| 6,359,985 B1 | 3/2002 | Koch et al. |
| 6,408,082 B1 | 6/2002 | Rhoads et al. |
| 6,427,020 B1 | 7/2002 | Rhoads |
| 6,438,236 B1 | 8/2002 | Best et al. |
| 6,449,377 B1 | 9/2002 | Rhoads |
| 6,470,090 B2 * | 10/2002 | Oami et al. .................. 382/100 |
| 6,505,160 B1 | 1/2003 | Levy et al. |
| 6,512,796 B1 | 1/2003 | Sherwood |
| 6,512,837 B1 | 1/2003 | Ahmed |
| 6,522,770 B1 | 2/2003 | Seder et al. |
| 6,522,771 B2 | 2/2003 | Rhoads |
| 6,549,638 B2 | 4/2003 | Davis et al. |
| 6,571,144 B1 * | 5/2003 | Moses et al. .................. 700/94 |
| 6,574,350 B1 | 6/2003 | Rhoads et al. |
| 6,577,746 B1 | 6/2003 | Evans et al. |
| 6,580,819 B1 | 6/2003 | Rhoads |
| 6,625,297 B1 * | 9/2003 | Bradley ...................... 382/100 |
| 6,650,761 B1 | 11/2003 | Rodriguez et al. |
| 6,674,886 B2 | 1/2004 | Davis et al. |
| 6,681,028 B2 | 1/2004 | Rodriguez et al. |
| 6,683,966 B1 | 1/2004 | Tian et al. |
| 6,694,041 B1 | 2/2004 | Brunk |
| 6,700,991 B1 * | 3/2004 | Wu et al. ................... 382/100 |
| 6,714,683 B1 | 3/2004 | Tian et al. |
| 6,724,912 B1 | 4/2004 | Carr et al. |
| 6,757,300 B1 | 6/2004 | Pages et al. |
| 6,757,405 B1 * | 6/2004 | Muratani et al. ........... 382/100 |
| 6,768,807 B1 * | 7/2004 | Muratani .................... 382/100 |
| 2001/0017709 A1 | 8/2001 | Murakami et al. |
| 2001/0022848 A1 | 9/2001 | Rhoads |
| 2001/0024510 A1 | 9/2001 | Iwamura |
| 2001/0026629 A1 | 10/2001 | Oki |
| 2001/0030759 A1 | 10/2001 | Hayashi et al. |
| 2001/0053299 A1 | 12/2001 | Matsunoshita et al. |
| 2002/0001095 A1 | 1/2002 | Kawakami et al. |
| 2002/0003891 A1 | 1/2002 | Hoshino |
| 2002/0009208 A1 | 1/2002 | Alattar et al. |
| 2002/0018228 A1 | 2/2002 | Torigoe |
| 2002/0032864 A1 | 3/2002 | Rhoads et al. |
| 2002/0051237 A1 | 5/2002 | Ohara |

FOREIGN PATENT DOCUMENTS

| | | |
|---|---|---|
| EP | 366381 | 10/1989 |
| EP | 372 601 | 6/1990 |
| EP | 411 232 | 2/1991 |
| EP | 418 964 | 3/1991 |
| EP | 441 702 | 8/1991 |
| EP | 493 091 | 7/1992 |
| EP | 058 482 | 8/1992 |
| EP | 551 016 | 7/1993 |
| EP | 581 317 | 2/1994 |
| EP | 605 208 | 7/1994 |
| EP | 649 074 | 4/1995 |
| EP | 705 025 | 4/1996 |
| EP | 711061 | 5/1996 |
| EP | 0789480 | 8/1997 |
| EP | 872995 | 10/1998 |
| EP | 0642060 | 4/1999 |
| EP | 1122939 | 8/2001 |
| GB | 2063018 | 5/1981 |
| GB | 2067871 | 7/1981 |
| GB | 2196167 | 4/1988 |
| GB | 2204984 | 11/1988 |
| JP | 4-248771 | 2/1992 |
| JP | 5/242217 | 9/1993 |
| JP | 8-30759 | 2/1996 |
| WO | WO 89/08915 | 9/1989 |
| WO | WO 93/25038 | 12/1993 |
| WO | WO94/27228 | 11/1994 |
| WO | WO95/04665 | 2/1995 |
| WO | WO95/10813 | 4/1995 |
| WO | WO 95/10835 | 4/1995 |
| WO | WO 95/14289 | 5/1995 |
| WO | WO 95/20291 | 7/1995 |
| WO | WO 95/26494 | 8/1996 |
| WO | WO 96/27259 | 9/1996 |
| WO | WO97/43736 | 11/1997 |
| WO | WO98/14887 | 4/1998 |
| WO | WO98/20642 | 5/1998 |
| WO | WO98/24050 | 6/1998 |

| | | |
|---|---|---|
| WO | WO98/40823 | 9/1998 |
| WO | WO98/49813 | 11/1998 |
| WO | WO99/34277 | 7/1999 |
| WO | WO99/36876 | 7/1999 |
| WO | WO00/44131 | 7/2000 |
| WO | WO 01/08405 | 2/2001 |
| WO | WO 01/80169 | 10/2001 |

OTHER PUBLICATIONS

U.S. Appl. No. 60/114,725, filed Dec. 31, 1998, Levy.
U.S. Appl. No. 60/116,641, filed Jan. 21, 1999, Cookson.
U.S. Appl. No. 60/141,763, filed Jun. 30, 1999, Davis.
U.S. Appl. No. 60/158,015, filed Oct. 6, 1999, Davis et al.
U.S. Appl. No. 60/198,138, filed Apr. 17, 2000, Alattar.
U.S. Appl. No. 09/342,971, filed Jun. 29, 1999, Rodriguez et al.
U.S. Appl. No. 09/343,104, filed Jun. 29, 1999, Rodriguez et al.
U.S. Appl. No. 09/465,418, filed Dec. 16, 1999, Rhoads et al.
U.S. Appl. No. 09/476,686, filed Dec. 30, 1999, Rhoads et al.
U.S. Appl. No. 09/679,261, filed Oct. 4, 2000, Davis et al.
U.S. Appl. No. 09/562,517, filed May 1, 2000, Davis et al.
U.S. Appl. No. 09/547,664, filed Apr. 12, 2000, Rhoads et al.
U.S. Appl. No. 09/571,422, filed May 15, 2000, Rhoads et al.
U.S. Appl. No. 09/631,409, filed Aug. 3, 2000, Brundage et al.
U.S. Appl. No. 09/452,021, filed Nov. 30, 1999, Davis et al.
U.S. Appl. No. 09/670,115, filed Sep. 26, 2000, Rhoads et al.
U.S. Appl. No. 09/404,291, filed Sep. 23, 2001, Levy et al.
U.S. Appl. No. 09/234,780, filed Jan. 20, 1999, Rhoads et al.
U.S. Appl. No. 09/478,713, filed Jan. 6, 2000, Cookson.
U.S. Appl. No. 09/574,726, filed May 18, 2000, Rhoads et al.
U.S. Appl. No. 09/625,577, filed Jul. 25, 2000, Carr et al.
U.S. Appl. No. 09/765,102, filed Jan. 17, 2001, Shar.
"Access Control and COpyright Protection for Images, WorkPackage 8: Watermarking," Jun. 30, 1995, 46 pages.
"Access Control and COpyright Protection for Images, WorkPackage 3: Evaluation of Existing Systems," Apr. 19, 1995, 68 pages.
"Access Control and COpyright Protection for Images, WorkPackage 1: Access Control and Copyright Protection of Images Need Evaluation," Jun., 1995, 21 pages.
"Access Control and COpyright Protection for Images, Conditional Access and Copyright Protection Based on the Use of Trusted Third Parties," 1995, 43 pages.
Arachelian, "White Noise Storm," Apr. 11, 1994, Internet reference, 13 pages.
Arazi, et al., "Intuition, Perception, and Secure Communication," IEEE Transactionson Systems, Man, and Cybernetics, vol. 19, No. 5, Sep./Oct. 1989, pp. 1016–1020.
Arthur, "Digital Fingerprints Protect Artwork," New Scientist, Nov. 12, 1994, p. 24.
Audio Watermarking Architectures for Secure Digital Music Distribution, A Proposal to the SDMI Portable Devices Working Group by ARIS Technologies, Inc, Mar. 26, 1999, pp. 1–11.
Audio Watermarking Architectures for Persistent Protection, Presentation to SDMI PDWG, Mar. 29, 1999, J. Winograd, Aris Technologies, pp 1–16.

Audio Watermarking System to Screen Digital Audio Content for LCM Acceptance, A Proposal Submitted in Response to PDWG99050504–Transition CfP by ARIS Technologies, Inc., May 23, 1999, Document Version 1.0, 15 pages.
Aura, "Invisible Communication," Helskinki University of Technology, Digital Systems Laboratory, Nov. 5, 1995, 13 pages.
Bender, "Techniques for Data Hiding," Proc. SPIE, Vo. 2420, Feb. 9, 1995, pp. 164–173.
Bender et al., "Techniques for Data Hiding," Draft Preprint, Private Correspondence dated Oct. 30, 1995.
Bender et al., "Techniques for Data Hiding," Massachusetts Institute of Technology, Media Laboratory, Jan. 1995, 10 pages.
Bender, "Applications for Data Hiding," IBM Systems Journal, vol. 39, No. 3–4, pp. 547–568, 2000.
Boland et al., "Watgermarking Digital Images for Copyright Protection", Fifth Int'l Conference on Image Processing and it's Application, Jul. 1995, pp. 326–330.
Boneh, "Collusion–Secure Fingerprinting for Digital Data," Department of Computer Science, Princeton University, 1995, 31 pages.
Boney et al., "Digital Watermarks for Audio Signals," Proceedings of Multimedia '96, 1996 IEEE, pp. 473–480.
Boucqueau et al., Equitable Conditional Access and Copyright Protection for Image Based on Trusted Third Parties, Teleservices & Multimedia Communications, 2nd Int. Cost 237 Workshop, Second International Cost 237 Workshop, Nov., 1995; published 1996, pp. 229–243.
Brassil et al., "Hiding Information in Document Images," Nov., 1995, 7 pages.
Brassil et al., Electronic Marking and Identification Techniques to Discourage Document Copying, Proceedings of INFOCOM '94 Conference on Computer, IEEE Commun. Soc Conference, Jun. 12–16, 1994, 1278–1287.
Brown, "S–Tools for Windows, Version 1.00, COPYRGT. 1994 Andy Brown, What is Steganography," Internet reference, Mar. 6, 1994, 6 pages.
Bruckstein, A.M.; Richardson, T.J., A holographic transform domain image watermarking method, Circuits, Systems, and Signal Processing vol. 17, No. 3 p. 361–389, 1998. This paper includes an appendix containing an internal memo of Bell Labs, which according to the authors of the paper, was dated Sep. 1994.
Bruvndonckx et al., Neural Network Post–Processing of Coded Images Using Perceptual Masking, 1994, 3 pages.
Bruyndonckx et al., "Spatial Method for Copyright Labeling of Digital Images," 1994, 6 pages.
Burgett et al., "A Novel Method for Copyright Labeling Digitized Image Data," requested by e–mail from author (unavailable/password protected on IGD WWW site); received Sep. 18, 1995, 12 pages.
Caronni, "Assuring Ownership Rights for Digital Images," Published in the Proceedings of 'Reliable IT Systems,' VIS '95, HH. Bruggemann and W. Gerhardt–Hackl (Ed.), Vieweg Publishing Company, Germany, 1995, Jun. 14, 1994, 10 pages.
Caruso, "Digital Commerce, 2 plans for watermarks, which can bind proof of authorship to electronic works." New York Times, Aug. 7, 1995, one page.

Castro et al., "Registration of Translated and Rotated Images Using Finite Fourier Transforms," IEEE Transactions on Pattern Analysis and Machine Intelligence, vol. PAMI–9, No. 5, Sep. 1987, pp. 700–703.

Choudhury, et al., "Copyright Protection for Electronic Publishing over Computer Networks," IEEE Network Magzine, Jun. 1994, 18 pages.

Clarke, "Invisible Code Tags Electronic Images," Electronic Engineering Times, Jun. 12, 1995, n. 852, p. 42.

Cookson, Chris, General Principles of Music Uses on Portable Devices, presented to SDMI, Mar. 5, 1999.

"Copyright Protection for Digital Images, Digital Fingerprinting from FBI," Highwater FBI brochure, 1995, 4 pages.

"The Copyright Can of Worms Opened Up By The New Electronic Media," Computergram Internations, pCGN07170006, Jul. 17, 1995 and "The Copyright Can of Worms Opened Up By the New Electronic Media—2," Computergram Internations, pCGN07210008, Jul. 21, 1995, 3 pages total.

Cox et al., "Secure Spread Spectrum Watermarking for Multimedia," NEC Research Institute Technical Report, Dec. 5, 1995, 33 pages.

Cox, "A Secure, Robust Watermark for Multimedia," First International Workshop, U.K., May 30, 1996, pp. 185–206.

Cox et al., "A Secure Imperceptable Yet Perceptually Salient, Spread Spectrum Watermark for Multimedia," IEEE, Southcon/96, Conference Record, pp. 192–197, 1996.

"Cyphertech Systems: Introduces Digital Encoding Device to Prevent TV Piracy," Hollywood Reporter, Oct. 20, 1993, p. 23.

Dautzenberg, "Watermarking Images," Department of Microelectronics and Electrical Engineering, Trinity College Dublin, 47 pages, Oct. 1994.

Delaigle et al, "Digital Watermarking," Proc. SPIE—Int. Soc. Opt. Eng., vol. 2659, pp. 99–110, 1996.

Delaigle et al., "A Psychovisual Approach for Digital Picture Watermarking," 1995, 20 pages. DICE Digital Watermark System, Q&A, Dec., 1995, 12 pages.

Digimarc presentation at RSA Conference, approximately Jan. 17, 1996, 4 pages.

Fimmerstad, "The Virtual Art Museum," Ericsson Connexion, Dec., 1995, pp. 29–31.

Fitzgerald, "Invisible Digital Copyright ID," Editor & Publisher, Jun. 25, 1994, p. 62.

"Foiling Card Forgers With Magnetic 'Noise,'" Wall Street Journal, Feb. 8, 1994. Frequently Asked Questions About Digimarc Signature Technology, Aug. 1, 1995, http://www.digimarc/com, 9 pages.

"Foiling Card Forgers With Magnetic 'Noise,'" Wall Street Journal, Feb. 8, 1994.

Frequently Asked Questions About Digimarc Signature Technology, Aug. 1, 1995, http://www.digimarc.com, 9 pages.

Friedman, "The Trustworthy Digital Camera: Restoring Credibility to the Photographic Images," IEEE Transactions on Consumer Electronics, vol. 39, No. 4, Nov., 1993, pp. 905–910.

Gabor, et al., "Theory of Communication," J. Inst. Elect. Eng. 93, 1946, pp. 429–441.

Gruhl et al., "Information Hiding to Foil the Casual Counterfeiter," Proc. 2d Information Hiding Workshop, LNCS vol. 1525, pp. 1–15 (Apr. 15, 1998).

Hartung, "Digital Watermarking of MPEG–2 Coded Video in the Bitstream Domain," 1997 IEEE, pp. 2621–2624.

Hartung et al., Digital Watermarking of Raw and Compressed Video, Proc. SPIE 2952, Digital Compression Technologies and Systems for Video Communications, Oct., 1996, pp. 205–213.

Hecht, "Embedded Data Glyph Technology for Hardcopy Digital Documents," SPIE vol. 2171, Feb. 1994, pp. 341–352.

"High Water FBI Limited Presentation Image Copyright Protection Software," FBI Ltd brochure, Jul., 1995, 17 pages.

"Holographic signatures for ditigal images," The Seybold Report on Desktop Publishing, Aug. 1995, one page.

Humphrey, "Stamping Out Crime," Hollywood Reporter, Jan. 26, 1994, p. S48.

Jain, "Image Coding Via a Nearest Neighbors Image Model," IEEE Transactions on Communications, vol. COM–23, No. 3, Mar. 1975, pp. 318–331.

Johnson, "Steganography," Dec. 10, 1995, 32 pages.

JPEG Goup's JPEG Software (release 4), ftp.csua.berekeley, edu/pub/cypherpunks/applications/jsteg/jpeg. announcement.gz.

Kassam, Signal Detection in Non–Gaussian Noise, Dowden & Culver, 1988, pp. 1–96.

Koch et al., "Digital Copyright Labeling: Providing Evidence of Misuse and Tracking Unauthorized Distribution of Copyrighted Materials," Oasis Magazine, Dec. 1995, 3 pages.

Koch et al., "Copyright Protection for Multimedia Data," Fraunhofer Institute for Computer Graphics, Dec. 16, 1994, 15 pages.

Koch et al., "Towards Robust and Hidden Image Copyright Labeling," Proc. of 1995 IEEE Workshop on Nonlinear Signal and Image Processing, Jun. 20–22, 1995, 4 pages.

Kurak et al., "A Cautionary Note On Image Downgrading," 1992 IEEE, pp. 153–159.

Levy, "AIPL's Proposal for SDMI: An Underlying Security System" (slide presentation), Mar. 29, 1999, 23 slides.

Luc, "Analysis of Spread Spectrum System Parameters for Design of Hidden Transmission," Radioengineering, vol. 4, No. 2, Jun. 1995, pp. 26–29.

Machado, "Announcing Stego 1.0a2, The First Steganography Tool for the Macintosh," Internet reference, Nov. 28, 1993, 3 pages.

Macq, "Cryptology for Digital TV Broadcasting," Proceedings of the IEEE, vol. 83, No. 6, Jun. 1995, pp. 944–957.

Matthews, "When Seeing is Not Believing," New Scientist, Oct. 16, 1993, pp. 13–15.

Matsui et al., "Video–Steganography: How to Secretly Embed a Signature in a Picure," IMA Intellectual Property Project Proceedings, Jan. 1994, vol. 1, Issue 1, pp. 187–205.

Microsoft Response to CfP for Technology Solutions to Screen Digital Audio Content for LCM Acceptance, SDMI, PDWG Tokyo, May 23, 1999, 9 pages.

Mintzer et al., "Safeguarding Digital Library Contents and Users: Digital Watermarking," D–Lib Magazine, Dec. 1997, 12 pages.

Mintzer et al., "Safeguarding Digital library Contents and Users" Digital Watermarking, D–Lib Magazine, Dec. 1997: ISSN 1082–9873.

Mintzer et al., "Toward on–line, Worldwide Access to Vatican Library Materials," IBM J. Res. Develop. vol. 40 No. 2, Mar., 1996, pp. 139–162.

Moller, et al., "Rechnergestutzte Steganographie: Wie sie Funktioniert und warum folglich jede Reglementierung von Verschlusselung unsinnig ist," DuD, Datenschutz und Datensicherung, Jun. 18, 1994 318–326.

"NAB—Cyphertech Starts Anti–Piracy Broadcast Tests," Newsbytes, NEW03230023, Mar. 23, 1994.

Nakamura et al., "A Unified Coding Method of Image and Text Data Using Discrete Orthogonal Transform," Systems and Computers in Japan, vol. 21, No. 3, 1990, pp. 87–92.

Nakamura et al., "A Unified Coding Method of Dithered Image and Text Data Using Micropatterns," Electronics and Communications in Japan, Part 1, vol. 72, No. 4, 1989, pp. 50–56.

New Product Information, "FBI at AppleExpo" (Olympia, London), Nov., 1995, 2 pages.

Ohnishi et al., Embedding a Seal into a Picture Under Orthogonal Wavelet Transform, Proceedings of Multimedia '96, 1996, IEEE, pp. 514–421.

ORuanaidh et al, "Watermarking Digital Images for Copyright Protection," http://www.kalman.mee.tcd.ie/people/jjr/eva.sub.—pap.html, Feb. 2, 1996, 8 pages. (Also published Aug., 1996, IEE Proceedings–Vision, Image and Signal Processing, vol. 143, No. 4, ppo. 250–256.).

Pennebaker et al., JPEG Still Image Data Compression Standard, Chapter 3, "Aspects of the Human Visual System," pp. 23–27, 1993, Van Nostrand Reinhold, New York.

Pickholtz et al., "Theory of Spread–Spectrum Communications—A Tutorial," Transactions on Communications, vol. COM–30, No. 5, May, 1982, pp. 855–884.

Pitas et al., "Applying Signatures on Digital Images," IEEE Workshop on Nonlinear Image and Signal Processing, Neos Marmaras, Greece, pp. 460–463, Jun., 1995.

Port, "Halting Highway Robbery on the Internet," Business Week, Oct. 17, 1994, p. 212.

Response to CfP for Technlogy Solutions to Screen Digital Audio Content for LCM Acceptance, NTT Waveless Radio Consotium, May 23, 1999, 9 pages.

Rindfrey, "Towards an Equitable System for Access Control and Copyright Protection in Braodcast Image Services: The Equicrypt Approach," Intellectual Property Rights and New Technologies, Proc. of the Conference, R. Oldenbourg Verlag Wien Muchen 1995, 12 pages.

Roberts, "Picture Coding Using Pseudorandom Noise," IRE Trans. on Information Theory, vol. 8, No. 2, Feb., 1962, pp. 145–154.

Sanford II et al., "The Data Embedding Method", Proceedings of the SPIE vol. 2615, pp. 226–259, 1996.

Sapwater et al., "Electronic Copyright Protection," Photo>Electronic Imaging, vol. 37, No. 6, 1994, pp. 16–21.

Schneier, "Digital Signatures, Cryptographic Algorithms Can Create Nonforgeable Signatures for Electronic Documents, Making Them Valid Legal Instruments" BYTE, Nov. 1993, pp. 309–312.

Schreiber et al., "A Compatible High–Definition Television System Using the Noise–Margin Method of Hiding Enhancement Information," SMPTE Journal, Dec. 1989, pp. 873–879.

SDMI Example Use Scenarios (Non–Exhaustive), Version 1.2, Jun. 16, 1999.

shaggy@phantom.com, "Hide and Seek v. 4.0," Internet reference, Apr. 10, 1994, 3 pages.

Short, "Steps Toward Unmasking Secure Communications," International Journal of Bifurcation and Chaos, vol. 4, No. 4, 1994, pp. 959–977.

Simmons, "Subliminal Channels; Past and Present," ETT, vol. 5, No. 4, Jul.–Aug. 1994, pp. 45–59.

Sheng et al., "Experiments on Pattern Recognition Using Invariant Fourier–Mellin Descriptors," Journal of Optical Society of America, vol. 3, No. 6, Jun., 1986, pp. 771–776.

Sklar, "A Structured Overview of Digital Communications—a Tutorial Review—Part I," IEEE Communications Magazine, Aug., 1983, pp. 1–17.

Sklar, "A Structured Overview of Digital Communications—a Tutorial Review—Part II," IEEE Communications Magazine, Oct., 1983, pp. 6–21.

"Steganography," Intelluctual Property and the National Information Infrastructure The Report of the Working Group on Intellectual Property Rights, Sep. 1995, pp. 212–213.

Szepanski, "A Signal Theoretic Method for Creating Forgery–Proof Documents for Automatic Verification," Proceedings 1979 Carnahan Conference on Crime Countermeasures, May 16, 1979, pp. 101–109.

Szepanski, "Additive Binary Data Transmission for Video Signals," Papers Presented at Conf. Of Comm. Engineering Soc. Sep. 30–Oct. 3, 1980, Technical Reports vol. 74, pp. 342–352.

Szepanski, "Additive Binary Data Transmission for Video Signals," Conference of the Communications Engineering Society, 1980, NTG Technical Reports, vol. 74, pp. 343–351. (German text and English translation enclosed).

Tanaka et al., "Embedding Secret Information Into a Dithered Multi–Level Image," Proc. IEEE Military Comm. Conf., Sep. 1990, pp. 216–220.

Tanaka, "Embedding the Attribute Information Into a Dithered Image," Systems and Computers in Japan, vol. 21, No. 7, 1990, pp. 43–50.

Tanaka et al., "A Visual Retrieval System with Private Information for Image Database," Proceeding International Conference on DSP Applications and Technology, Oct. 1991, pp. 415–421.

Tanaka et al., "New Integrated Coding Schemes for Computer–Aided Facsimile," Proc. IEEE Int'l Conf. on Sys. Integration, Apr. 1990, pp. 275–281.

Thomas, Keith, Screening Technology for Content from Compact Discs, May 24, 1999, 11 pages.

Tirkel et al., "A Two–Dimensional Digital Watermark," 1995, 6 pages.

Tirkel et al., "Electronic Water Mark," Dicta–93, Marquarie University, Sydney, Australia, Dec., 1993, pp. 666–672.

Tirkel et al, "Electronic Water Mark," DICTA–93, Macquarie University, Sydney, Australia, Dec., 1993, pp. 666–673.

Toga et al., "Registration Revisited," Journal of Neuroscience Methods, 48 (1993), pp. 1–13.

van Schyndel et al., "Towards a Robust Digital Watermark," ACCV '95, vol. 2, Dec., 1995, pp. 504–508.

van Schyndel et al., "A Digital Watermark," IEEE International Conference on Image Processing, Nov. 13–16, 1994, pp. 86–90.

Vidal et al., "Non–Noticeable Information Embedding in Color Images: Marking and Detection", IEEE 1999, pp. 293–297.

Voyatzis et al., "Embedding Robust Watermarks By Chaotic Mixing", Digital Signal Processing Proceedings, IEEE Jul. 1977, pp. 213–216, vol. 1.

Wagner, "Fingerprinting," 1983 IEEE, pp. 18–22.

Walton, "Image Authentication for a Slippery New Age," Dr. Dobb's Journal, Apr. 1995, pp. 18–26, 82–87.

"Watermarking & Digital Signature: Protect Your Work!" Published on Internet 1996, http://Itswww.epfl.ch/.about.jordan/watermarking.html.

Weber et al., "Correlative Image Registration," Seminars in Nuclear Medicine, vol. XXIV, No. 4, Oct. 1994, pp. 311–323.

Winograd, J.M., "Audio Watermarking Architecture for Secure Digital Music Distribution," a Proposal to the SDMI Portable Devices Working Group, by Aris Technologies, Inc., Mar. 26, 1999.

Wise, "The History of Copyright, Photographers' Rights Span Three Centuries," Photo>Electronic Imaging, vol. 37, No. 6, 1994.

Wolfgang et al, "A Watermark for Digital Images," Computer Vision and Image Processing Laboratory, Purdue University, Sep. 1996, pp. 219–222.

Zhao et al., "Embedding Robust Labels Into Images for Copyright Protection," Proc. of the International Congress on Intellectual Property Rights for Specialized Information, Knowledge and New Technologies (Vienna, Austria) Aug. 21–25, 1995, 10 pages.

* cited by examiner

SELF-ORIENTING WATERMARKS

RELATED APPLICATION DATA

This application is a Continuation of Ser. No. 09/502,543 now U.S. Pat. No. 6,625,297 filed Feb. 10, 2000 which is hereby incorporated by reference.

TECHNICAL FIELD

The invention relates to digital watermarking.

BACKGROUND OF THE INVENTION

Digital watermarking is a process for modifying a host signal or object to embed a machine-readable code into the host. The host may be modified such that the embedded code is imperceptible or nearly imperceptible to the ordinary observer upon viewing or playback, yet may be detected through an automated detection process. Most commonly, digital watermarking is applied to media such as images, audio signals, and video signals. However, it may also be applied to other types of media, including documents (e.g., through line, word or character shifting), software, multi-dimensional graphics models, and surface textures of objects.

Digital watermarking systems have two primary components: an embedding component that embeds the watermark in the host, and a reading component that detects and reads the embedded watermark. The embedding component embeds a watermark pattern by altering data samples of the host in the spatial, frequency, or other transform domains. The reading component analyzes target content to detect whether a watermark pattern is present. In applications where the watermark encodes information, the reader extracts this information from the detected watermark.

One challenge to the developers of watermark embedding and reading systems is to ensure that the watermark is detectable even if the watermarked media content is corrupted in some fashion. The watermark may be corrupted intentionally, so as to bypass its copy protection or anti-counterfeiting functions, or unintentionally through various transformations that result from routine manipulation of the content. In the case of watermarked images, such manipulation of the image may distort the watermark pattern embedded in the image.

The invention provides a watermarking method in which attributes of the watermark used to embed information also serve to orient the watermark in the reading process. One aspect of the invention is a self orienting watermark that carries a message and has attributes that provide an orientation of the watermark signal in a host signal.

Another aspect of the invention is a method of embedding a self orienting watermark in a host signal. This method converts a message into a watermark signal having an attribute that orients the watermark in the host signal, and applies the watermark signal to the host signal. In one implementation, the method converts the message to an FSK signal. The FSK signaling frequencies have spectral attributes that orient the watermark in the host signal.

Another aspect of the invention is a method of decoding a self orienting watermark in a host signal. This decoding method uses an attribute of the watermark to determine orientation of the watermark in a host signal. The attribute provides a dual functionality of determining a watermark's orientation and carrying a message. In one implementation, this attribute is an FSK signal whose signaling frequencies help identify the orientation of the watermark and also encode a message. After finding the watermark in the host signal, the method proceeds to read the message encoded into it.

Further features and advantages of the invention will be apparent from the following detailed description and accompanying drawings.

DETAILED DESCRIPTION

1.0 Overview of Watermarking Method

The following sections describe a watermarking method that converts a watermark message into a self-orienting watermark signal and embeds the watermark signal in a host signal. The spectral properties of the watermark signal facilitate its detection, even in applications where the watermarked signal is corrupted. Because of these properties, the watermark signal can perform the dual function of identifying the watermark's presence and orientation in potentially corrupted media, and also conveying a hidden message in the host signal. Such a watermark may be referred to as a self-orienting watermark.

Like conventional watermarking systems, the self-orienting watermarking systems described below have an embedder that embeds the watermark in a host signal to create a watermarked signal, and a reader that detects the watermark in a potentially corrupted watermarked signal and reads the watermark message. The embedder converts the desired message into a FSK signal. It then identifies parts of the host signal to receive the watermark and alters host signal values in those parts with corresponding values from the FSK signal. Typically, the objective of the embedder is to encode the watermark to make it imperceptible during ordinary playback of the watermarked signal, yet recoverable by the reader despite intentional or unintentional corruption.

In many applications, the host signal is multi-dimensional. For example, the samples in a still image have spatial coordinates (e.g., x and y coordinates for a 2-D image), and one or more color values depending on the color space. The samples in an audio file have a discrete time value and an intensity value. Similarly, the samples in video have spatial coordinates, temporal coordinates (e.g., the frame or field), and one or more color values. The FSK signal may be inserted along one dimension, e.g., a row of luminance values of an image, or along multiple dimensions. In addition, each dimension may encode a version of the same message, or a different message. (Although 1- and 2-D signals are most commonly watermarked, 3- and more-dimension signals may also be watermarked, e.g., wireframe or mesh computer models of 3-D objects.)

While the following description provides specific implementation details of an image watermarking method, the general approach may be applied to other watermarkable objects (including video and audio).

2.0 FSK Signaling Background

Figure 1A:
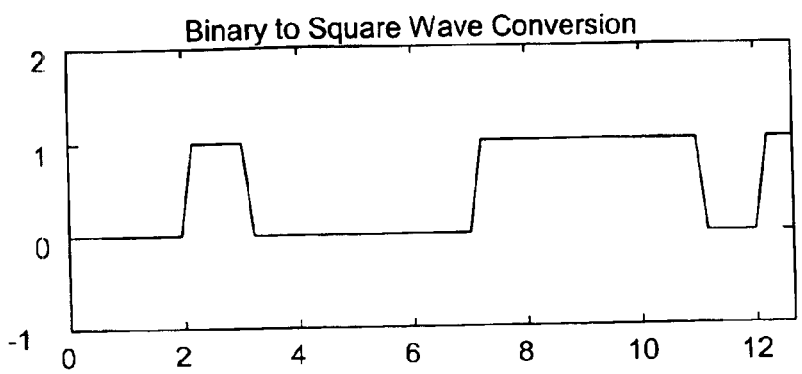
FIG. 1A illustrates an example of a binary signal converted to a square wave.
Figure 1B:
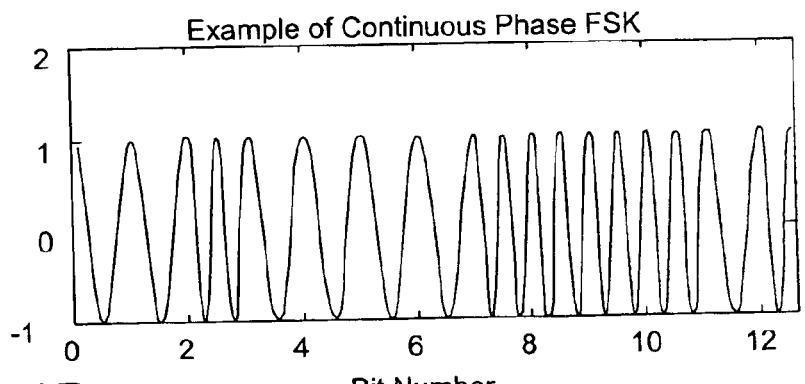
FIG. 1B illustrates an example of the binary signal converted to a continuous phase FSK signal.

FSK signaling is a digital communications technique in which data is conveyed by shifting between distinct frequencies of transmission. To illustrate the concept, consider the example shown in FIGS. 1A–B. Suppose, for example, that one wishes to transmit some arbitrary sequence of zeros and ones. Conceptually, one can visualize the sequence as first being converted to a square wave, where the instantaneous amplitude of the square wave is represented by its corresponding binary value in the original sequence as shown in FIG. 1A. Following conversion to a square wave representation, an amplitude to frequency conversion is performed, where a lower frequency is transmitted when the square wave is in a trough and a higher frequency is sent when the square wave is cresting as shown in FIG. 1B. The result of the amplitude to frequency conversion is a typical FSK signal.

In this example, notice that when the lower frequency is transmitted the signal goes through exactly one cycle per bit. When the higher frequency is transmitted the signal goes through exactly two cycles.

Figure 2:
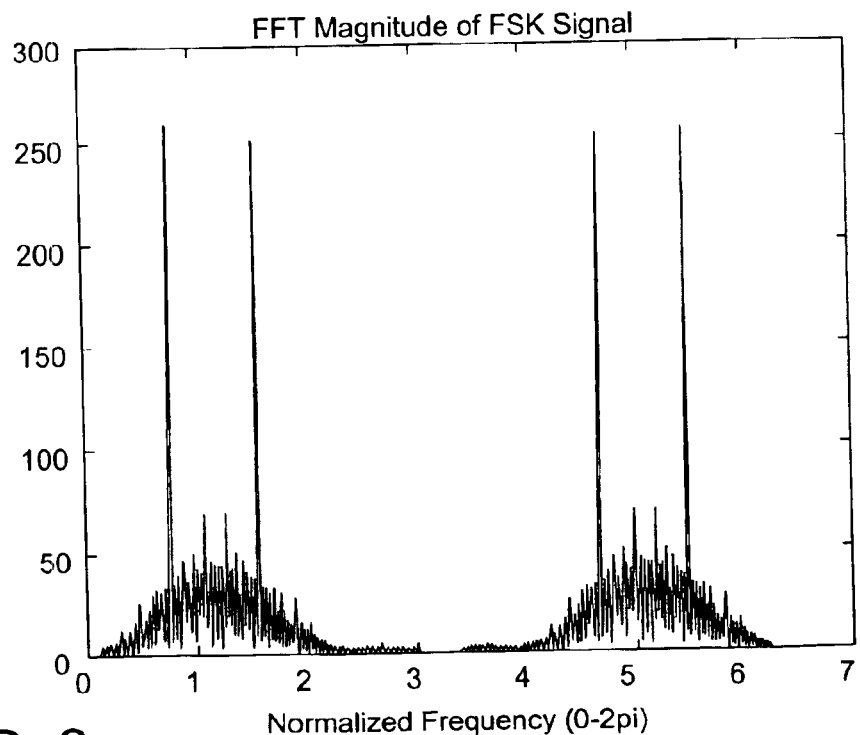
FIG. 2 is a plot illustrating the FFT magnitude of the FSK signal shown in FIG. 1B.

This particular example is known in the literature as 2-FSK with continuous phase. See E.A. Lee, D. G. Messershmitt, *Digital Communication, Second Edition*, Chapter 6, 1994. The "2" comes from the fact that there are only two frequency states of the signal; generally M different frequencies can be used. The term "continuous phase" arises from the fact that there are no phase discontinuities between adjacent bits. There are frequency domain implications as well for continuous phase FSK as shown in FIG. 2. The peaks in the magnitude spectrum are distinct, and as such, can be used to identify the FSK signal when embedded in a host signal in watermarking applications.

3.0 A Watermark System

The following sections describe implementations of a watermark embedder, detector, and reader that operate on media signals (e.g., images, audio, etc.). The embedder encodes a message into a digital signal by modifying its sample values such that the message is imperceptible to the ordinary observer in output form. The detector captures a representation of the signal suspected of containing a watermark and then processes it to detect the watermark and determine its orientation. To extract the message, the reader uses the orientation to approximate the position of samples at encoding time and decodes the message.

Figure 3:
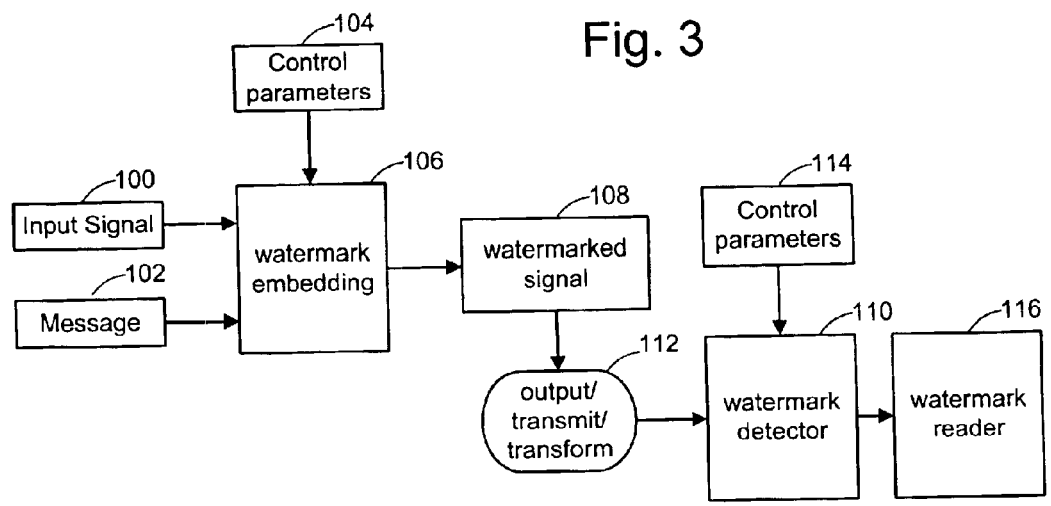
FIG. 3 is a diagram of a watermark embedder and detector system.
Figure 4:
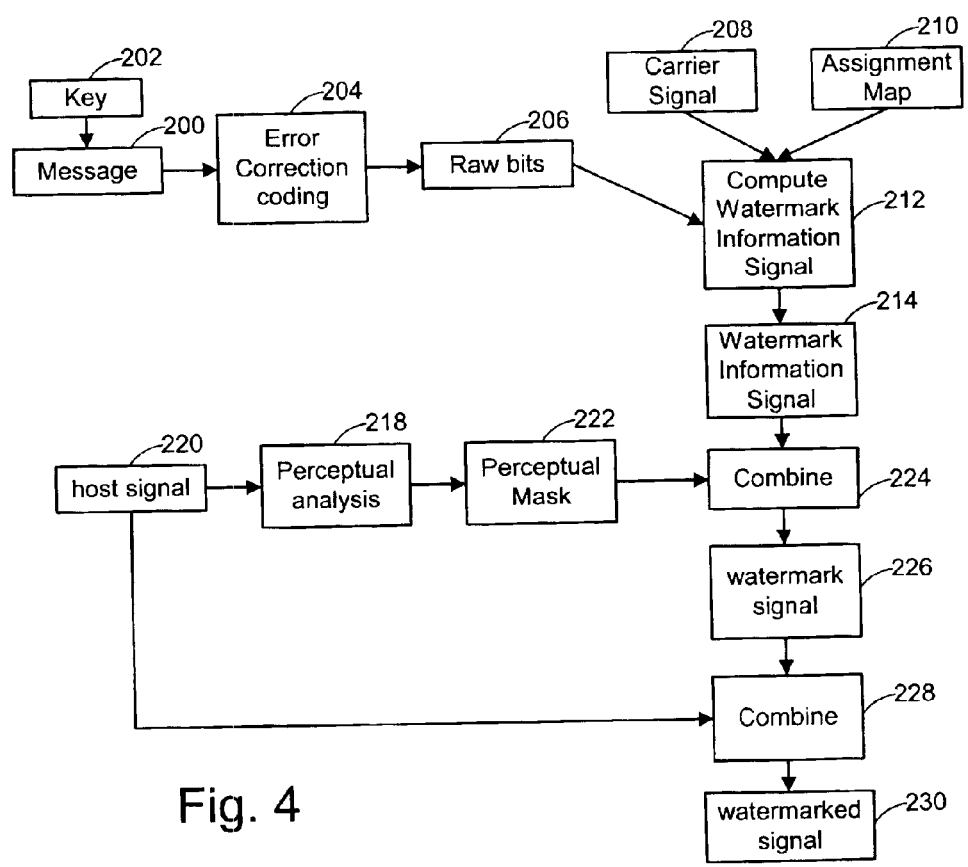
FIG. 4 is a diagram illustrating an example of a watermark embedder.

FIG. 3 is a block diagram summarizing image processing operations involved in embedding and reading a watermark. There are three primary inputs to the embedding process: a host signal 100, the message 102, and a series of control parameters 104. The control parameters may include one or more keys. One key may be used to encrypt the message. Another key may be used to control the generation of a watermark carrier signal, a mapping of information bits in the message to positions in a watermark information signal, and an application of the watermark information signal to the host signal. Other parameters may include control bits added to the message.

The watermark embedding process 106 performs a watermarking function on the message to convert it to a watermark information signal. It then combines this signal with the host signal to create a watermarked signal 108.

The watermark detector 110 operates on a digitized signal suspected of containing a watermark. As depicted generally in FIG. 1, the signal may undergo various transformations 112, such as conversion to and from an analog domain, copying, editing, compression/decompression, transmission etc. Using parameters 114 from the embedder (e.g., carrier signal properties, control bits, key(s)), it performs a series of correlation or other operations on the captured signal to detect the presence of a watermark and to determine its orientation. For image signals, the orientation may be expressed in the form of orientation parameters, such as translation, rotation, scale, differential scale (shear), etc. Using these parameters to approximate the orientation of the watermark signal, the reader 116 extracts the message from the suspect signal. Some implementations do not perform correlation, but instead, use some other detection process or proceed directly to extract the watermark signal.

3.1 Embedding

FIG. 2 is a block diagram illustrating an implementation of an exemplary embedder in more detail. The embedding process begins with the message 200. As noted above, the message is binary number suitable for conversion to a watermark signal. For additional security, it may be encrypted with an encryption key 202. In addition to the information conveyed in the message, the embedder may also add control bit values to the message to assist in verifying the accuracy of a read operation. These control bits, along with the bits representing the message, are input to an error correction coding process 204 designed to increase the likelihood that the message can be recovered accurately in the reader.

There are several alternative error correction coding schemes that may be employed. Some examples include BCH, convolution coding, and turbo codes. These forms of error correction coding are sometimes used in communication applications where data is encoded in a carrier signal that transfers the encoded data from one place to another. In the digital watermarking application discussed here, the raw bit data is encoded in a fundamental carrier signal.

In addition to the error correction coding schemes mentioned above, the embedder and reader may also use a Cyclic Redundancy Check (CRC) to facilitate detection of errors in the decoded message data.

The error correction coding function 204 produces a string of bits, termed raw bits 206, that are embedded into a watermark information signal. Using a carrier signal 208 and an assignment map 210, the illustrated embedder encodes the raw bits in a watermark information signal 212, 214. The carrier signal may be a random or pseudo-random signal. The assignment map specifies where to place the watermark information in the host signal. In some applications, the embedder may encode a different message in different locations of the signal.

While the precise functions and processing order may vary with the implementation, the embedding process proceeds generally as follows. The embedder modulates the carrier signal with the raw bit signal. It then FSK modulates the resulting carrier signal. Finally, it maps the FSK signal to a location or locations in the host signal. This process creates a watermark information signal. The processing order may be rearranged, and some processing stages may be omitted in some implementations. For instance, some implementations may apply FSK modulation to the raw bit signal without modulating the raw bits with a carrier signal. The carrier signal may be used to spread a raw bit over a pseudo-random signal. While advantageous in some applications, this spreading operation is not necessary.

Having summarized a general embedding framework, a number of points can be made. First, the embedder may perform a similar approach in any transform domain. For example, the FSK modulated signal may be mapped to samples in the spatial or temporal domain or some other transform domain.

Second, the specific mathematical relationship among the raw bits, the carrier, the FSK modulator, and the assignment map may vary with the implementation. For example, the message may be convolved with the carrier, multiplied with the carrier, added to the carrier, etc.

Third, the carrier signal may remain constant for a particular application, or it may vary from one message to another. For example, a secret key may be used to generate the carrier signal.

Fourth, the assignment map may map a raw bit (or its corresponding modulated signal) to a single location or many locations or orientations, in one or more transform domains. For example, the FSK signal could be applied to the rows and columns of image samples in the spatial domain.

Fifth, the assignment map may remain constant, or it may vary from one message to another. In addition, the carrier signal and map may vary depending on properties of the host signal. In sum, there are many possible design choices within the implementation framework described above.

Returning to FIG. 2, the embedder makes a perceptual analysis 218 of the host signal 220 to identify portions of the signal that can withstand more watermark signal content without substantially impacting fidelity. For images, the perceptual analysis identifies portions where there is more image activity. In these areas, the sample values are changing more than other areas and have more signal strength. The output of the perceptual analysis is a perceptual mask 222 that represents signal activity. For example, the mask may be implemented as an array of multipliers, which selectively increase the signal strength of the watermark information signals in areas of greater signal activity. The embedder combines (224) the watermark information signal and the perceptual mask to yield the watermark signal 226. Finally, it combines (228) the host signal 220 and the watermark signal 226 to create the watermarked signal 230.

In one implementation where the watermark signal is inserted in the spatial domain of an image, the embedder adds the image samples in the watermark signal to the corresponding samples in the input image to create the watermarked image 230. In other implementations, the embedder may perform alternative functions to combine the watermark signal and the input image (e.g., multiplication). The net effect is that some image samples in the input image are adjusted upward, while others are adjusted downward. The extent of the adjustment is greater in areas of the image having greater signal activity.

3.2 Example Embedder Implementation

Figure 5:
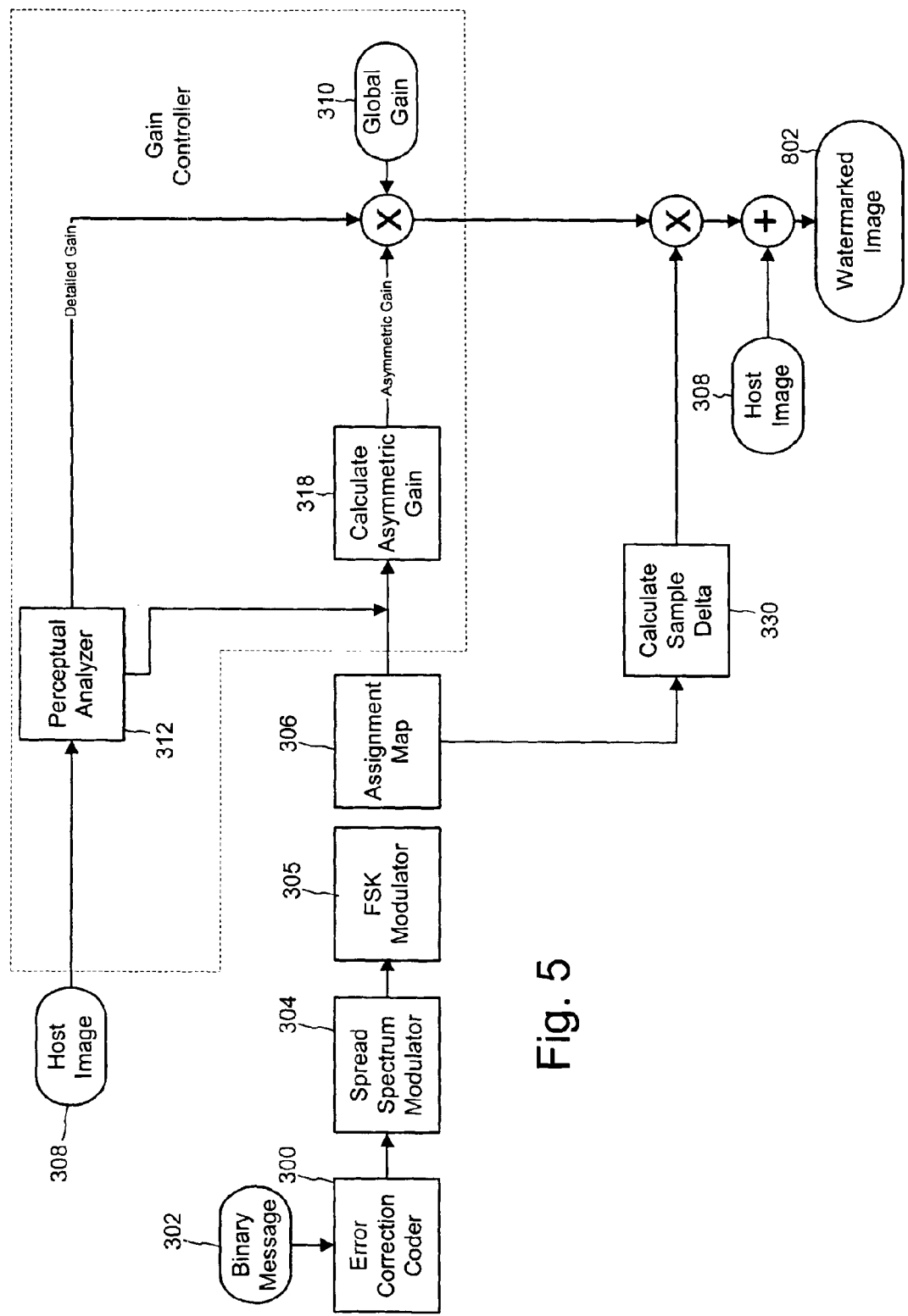
FIG. 5 is a diagram illustrating another example of a watermark embedder.

The following sections describe an implementation of the digital image watermark embedder depicted in FIG. 5. The embedder inserts a self-orienting watermark into the spatial domain of the host image. The watermark serves a dual function of conveying a message and identifying the watermark location in the image.

The embedder inserts watermark components in rows and columns of luminance samples of the host image at a pre-determined resolution (e.g., 100 dpi–300 dpi). The message payload size varies from one application to the next. Typically, the payload ranges from 2–128 bits.

3.2.1 Encoding the Message

The embedder converts binary message bits into a series of binary raw bits that it hides in the host image. As part of this process, a message encoder 300 appends certain known bits to the message bits 802. It performs an error detection process (e.g., parity, Cyclic Redundancy Check (CRC), etc.) to generate error detection bits and adds the error detection bits to the message. An error correction coding operation then generates raw bits from the combined known and message bit string.

For the error correction operation, the embedder employs convolution coding. Other alternatives include BCH and turbo coding.

3.2.2 Spread Spectrum Modulation

The embedder uses spread spectrum modulation as part of the process of creating a watermark signal from the raw bits. A spread spectrum modulator 304 spreads each raw bit into a number of "chips." The embedder generates a pseudo random number that acts as the carrier signal of the message. To spread each raw bit, the modulator performs an exclusive OR (XOR) operation between the raw bit and each bit of a pseudo random binary number of a pre-determined length. Preferably, the pseudo random number should contain roughly the same number of zeros and ones. The spread spectrum modulator produces a binary sequence having a set of binary numbers corresponding to each raw bit.

3.2.3 FSK Modulation

Next, an FSK modulator 305 converts the spread spectrum signal into an FSK signal. In particular, the FSK modulator uses 2-FSK with continuous phase: a first frequency represents a zero; and a second frequency represents a one. The FSK modulated signal is applied to rows and columns of the host image. Each binary value in the input signal corresponds to a contiguous string of at least two samples in a row or column of the host image. Each of the two frequencies, therefore, is at most half the sampling rate of the image. For example, the higher frequency may be set at half the sampling rate, and the lower frequency may be half the higher frequency.

3.2.4 Mapping the Watermark Information Signal

The embedder maps the FSK modulated signal to locations in the host image. An assignment map 306 assigns the FSK modulated signal, or segments of it, to selected rows and columns of the host image. Depending on the message and image size, the embedder may map the same message to each row and column. In some applications, the embedder may map parts of a message, or different messages, to different rows or columns of the image. Also, it is possible to map the FSK signal in different directions other than the vertical and horizontal directions.

3.2.5 Computing the Watermark Information Signal

The embedder applies the watermark information signal to the host image by adding samples of the watermark to corresponding samples in the host image. Before adding the watermark information signal to the host, it converts the watermark information signals to delta values that alter corresponding samples in the host image so as to embed the watermark information (330).

At this stage, the embedder has produced an FSK modulated signal and mapped it into a two dimensional image space. Next, it assigns a delta to each sample of the watermark based on the value of the FSK signal (or signals)

mapped to that location. In particular, for a mapped sample having a value of one, it adds to the corresponding luminance value, and for a mapped sample having a value of zero, it subtracts from the corresponding luminance value.

In an alternative implementation, the embedder may apply the watermark signal by multiplying it with the host image.

Optionally, a gain controller may then adjust the magnitude of each sample in the watermark information signal.

3.2.6 Gain Control and Perceptual Analysis

Though not necessary, it is often useful to control the gain of the watermark information signal. Through gain control, the embedder may increase the strength of the signal while reducing its perceptibility to ordinary observers. The embedder shown in FIG. 5 provides an example of a gain controller that takes into account the image and the watermark information signal to calculate an array of gain multipliers to be applied to the watermark information signal.

FIG. 5 depicts the gain controller used in the embedder. Note that the gain controller operates on the luminance data 308, the watermark signal, and a global gain input 310, which may be specified by the user. A perceptual analyzer component (312) of the gain controller performs a perceptual analysis on the luminance samples to identify areas that can tolerate a stronger watermark signal without substantially impacting visibility. In places where the naked eye is less likely to notice the watermark, the perceptual analyzer increases the strength of the watermark. Conversely, it decreases the watermark strength where the eye is more likely to notice the watermark.

The perceptual analyzer shown in FIG. 5 performs a series of filtering operations on the image block to compute an array of gain values. There are a variety of filters suitable for this task. These filters include an edge detector filter that identifies edges of objects in the image, a non-linear filter to map gain values into a desired range, and averaging or median filters to smooth the gain values. Each of these filters may be implemented as a series of one-dimensional filters (one operating on rows and the other on columns) or two-dimensional filters. The size of the filters (i.e. the number of samples processed to compute a value for a given location) may vary (e.g., 3 by 3, 5 by 5, etc.). The shape of the filters may vary as well (e.g., cross-shaped, square etc.). The perceptual analyzer process produces a detailed gain multiplier. The multiplier is a vector with elements corresponding to image samples.

The embedder may optionally compute another type of gain, called asymmetric gain (318). Asymmetric gain helps to increase the chances of an accurate read of the watermark message. This component of the gain controller analyzes the filtered luminance samples to determine whether they have values that are consistent with the watermark information signal. To illustrate the concept, consider a segment of the FSK signal representing a value of one. In the watermark information signal, this segment may correspond to a row of four luminance samples forming a wave with energy concentrated at the FSK frequency that represents a one. If the corresponding samples in the host signal already oscillate in a similar fashion, then the asymmetric gain may leave the watermark information signal unchanged. Conversely, if the corresponding samples do not oscillate in the same fashion, the asymmetric gain for selected samples may be set so that the resulting watermarked samples are more likely to produce the desired value in a read operation.

In summary, the gain controller shown in FIG. 5 has three sources of gain: the detailed gain from a perceptual analysis of the host image, the global gain provided as input, and the asymmetric gain from a comparison of the host image to the watermark information signal. The embedder multiplies the individual gain components together to get the composite gain.

3.2.7 Forming the Watermarked Signal

To compute the watermark signal, the embedder multiplies the delta values produced in block 330 by the composite gain. It then adds the samples of the watermark signal to corresponding samples of the host signal to produce the watermarked image.

3.3 Detecting an FSK Watermark

3.3.1 Establishing Orientation

Figure 6:
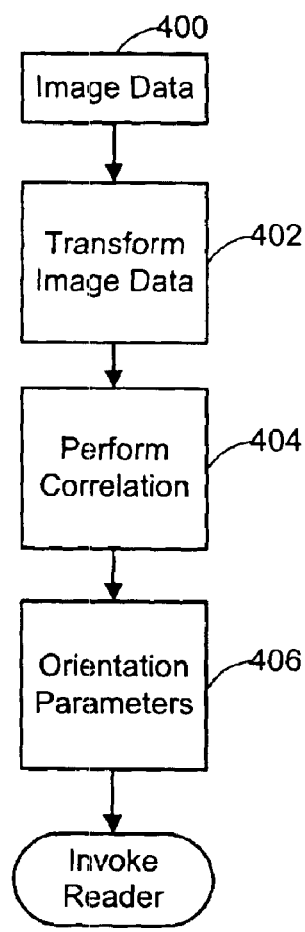
FIG. 6 is a flow diagram illustrating a process for determining the orientation of a watermark signal in a signal suspected of containing a watermark.

FIG. 6 is a flow diagram illustrating a process for detecting a watermark and determining its orientation in a signal suspected of containing a self-orienting watermark. First, the detector transforms the image data 400 to another domain 402, (e.g., a spatial frequency domain, and then performs a series of correlation or other detection operations 404. The correlation operations match the watermark pattern with the target image data to detect the presence of the watermark and its orientation parameters 406.

Figure 7:
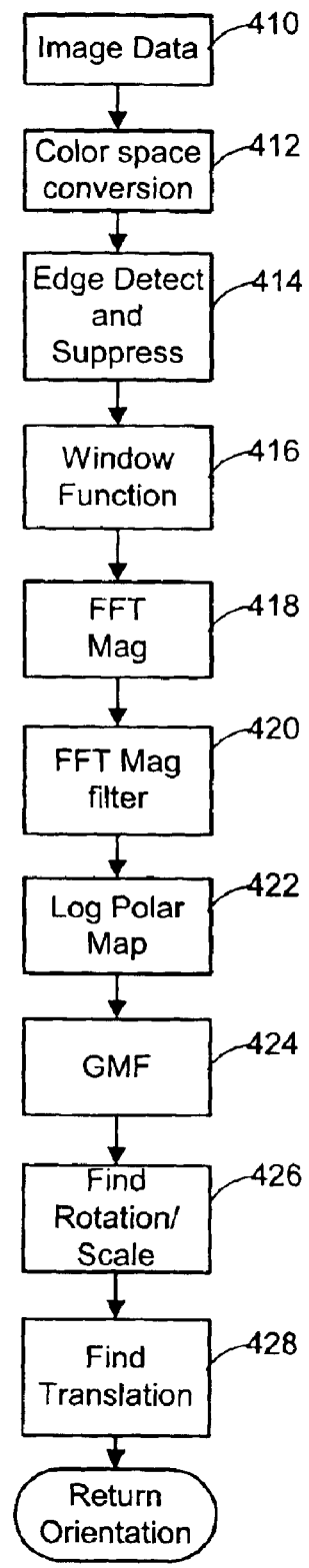
FIG. 7 is a flow diagram illustrating a more detailed implementation of the process depicted in FIG. 6.
Figure 8:
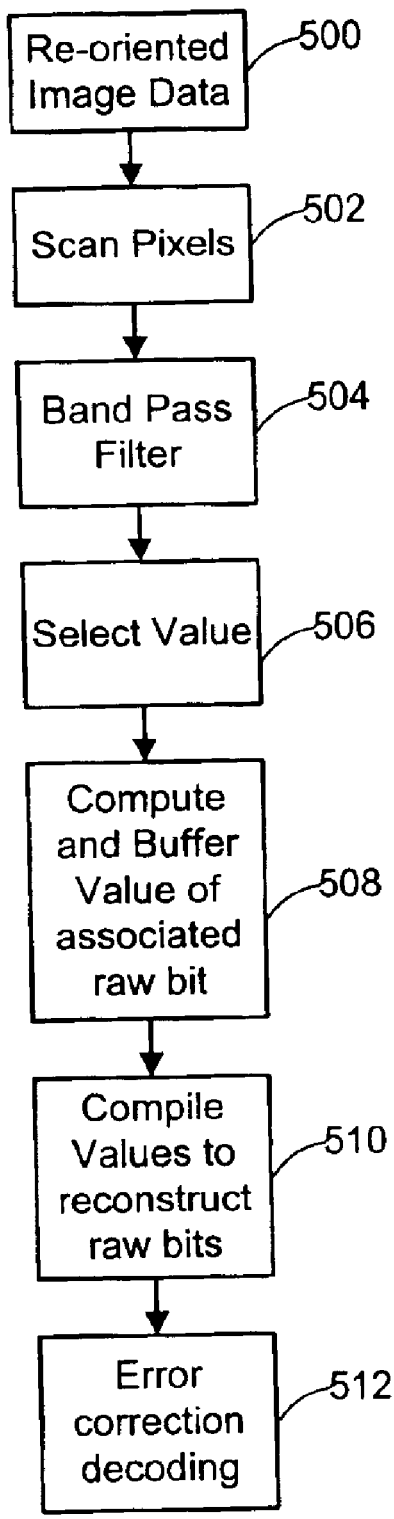
FIG. 8 is a flow diagram illustrating a process for extracting a message from a watermark signal embedded in another signal.

FIG. 7 is a flow diagram illustrating a detector implementation in more detail. The detector transforms the image samples (410) to the color space in which the watermark was embedded (e.g., into luminance samples) (412). Optionally, it may perform various filtering operations to enhance the detection process. For example, one form of enhancement is to identify and remove signal content that would otherwise tend to obscure the watermark pattern and make it more difficult to compute its orientation. Since this detector determines the watermark's rotation angle and scale based on an FSK signal at known frequency ranges, it may improve the correlation process by removing signal content at other frequency ranges. As such, a filter may be used to highlight edges in the signal and then reduce or eliminate them (414). One type of filter suitable for this task is a multi-axis high pass filter (e.g., LaPlacian, Sobol, etc.).

Next, it prepares the image signal for a Fast Fourier Transform (FFT) by applying a window function (416). It then performs an FFT on the luminance signal to produce a Fourier magnitude signal (418). Optionally, it may filter the FFT magnitude array to boost peaks and suppress the fall-off region around these peaks.

To determine rotation and scale parameters of the watermark's orientation, the detector maps the signal to a log-polar coordinate space (422) and correlates the mapped signal with a detection pattern (424). One axis in the log-polar space represents a log of the scale parameter, and the other represents the rotation angle parameter. This mapping process is sometimes referred to as a Fourier Mellin transform. The detector correlates the resulting sample array in the log polar coordinate system with a log polar representation of a detection pattern. The detection pattern represents cosine waves at the FSK signaling frequencies. In the spatial frequency domain (e.g., FFT magnitude plot of the detection pattern), the detection pattern has energy focused at grid points located at the signaling frequencies. (This arrangement is further detailed in U.S. Pat. No. 5,862,260, and in application Ser. No. 09/452,023, the complete disclosures of which are incorporated herein by reference.)

When FSK signaling is applied to the rows and columns, the FFT magnitude of pure cosine waves at the signaling frequencies produces grid points along the vertical and horizontal axes in a two-dimensional frequency spectrum. If different signaling frequencies are used for the rows and columns, these grid points will fall at different distances from the origin. These grid points, therefore, may form a detection pattern that helps identify the rotation angle of the watermark in a suspect signal. Also, if an image has been rotated or scaled, the FFT of this image will have a different frequency spectrum than the original image. In particular, the peaks once located at the FSK signaling frequencies will be rotated and scaled. By aligning the peaks in the distorted image with the original peaks, the detector can re-align the image to its original orientation.

A variety of correlation methods may be used to find the rotation and scale parameters that optimize the correlation between the suspect signal and the detection pattern. This detector implementation uses a form of a generalized matching filter (GMF) (424). The GMF performs yet another FFT on the suspect signal and the pattern, multiplies the resulting signals (i.e. computes the dot product of the two FFT arrays), and then computes the inverse FFT of the product. The product comprises an array of correlation values in log-polar space. The detector may use interpolation to find the inter-sample location of the rotation and scale vector that provides the best correlation. It may use the same approach to find a set of rotation-scale vectors with the top correlation values (426).

At this stage, the detector has recovered rotation and scale parameters that estimate the orientation of the watermark in the suspect signal. Before proceeding, it is worth noting that there are several alternative approaches to estimating the rotation and scale parameters. Recall that the FFT magnitude of the FSK signal has peaks at the signaling frequencies as shown in FIG. 2. One way to determine the rotation is to step through a set of candidate rotation angles, apply the candidates to the image, and find the rotation angle that yields an FFT magnitude with the highest peak at the signaling frequencies. Since the image is two dimensional, the embedder can insert the FSK signal in the rows and columns of the image. Thus, this process may be applied separately to the rows and columns to find rotation angles that maximize the peaks in each dimension. Alternatively, a similar process may be applied to both rows and columns simultaneously. In this case, the approach is similar, except that the FFT magnitude is two-dimensional, and there are four peaks (two for the rows and two for the columns).

Once rotation is established, the detector derives the scale parameter from the location of the peaks. If the resolution of the image has been increased relative to its resolution at embedding, then the location of the peaks will shift toward the origin in the Fourier spectrum. Conversely, the location of the peaks will shift away from the origin if the resolution has decreased. If the watermark is embedded in both the rows and columns, a separate scale parameter may be established for each dimension.

As another alternative, the detector may employ projection techniques to ascertain orientation. In one such approach, the detector takes the absolute value of the FFT of each row of the watermarked image, and accumulates the result for all rows. If the watermarked image is correctly aligned, this process will produce two peaks exactly at the FSK signaling frequencies. If there is scaling, the location of the peaks changes. If the image is rotated, the result will appear like scaling combined with a loss in peak strength. The amount of rotation and scale can be derived from the position and amplitude of the peaks.

If the message content within the watermark is unknown, finding the origin of the watermark in the suspect signal presents a challenge. Generally, the implementer of the system can address this challenge by giving the watermark an attribute that enables the detector to derive it, even if the signal has been corrupted in some fashion. Just as the FSK frequencies represent an attribute that allows the detector to recover rotation and scale, the embedder may give the watermark another attribute that allows the detector to recover translation parameters that specify an origin or point of reference from which to orient the reader. After correcting for rotation and scale, the detector can then search for the attribute for recovering the translation parameters.

One such attribute is a sequence of phase offsets. Notice that in FIG. 1B, the value of the FSK signal at a bit transition is always "1." Measured from bit to bit, the signal contains only integer cycles of a pure cosine, i.e. no phase offset. Instead of embedding with the same phase offset every row, the embedder may insert an offset that is row dependent. Knowing how the embedded phase offset varies with each row, the detector can establish a row of origination. The same procedure could be used to find the column of origination. The intersection of the two then defines the origin.

Another attribute is a sequence of FSK signaling frequencies. For example, the embedder may vary the FSK signaling frequencies over a sequence of two or more rows and columns. The detector can then identify these frequencies by computing the FFT magnitude of the rows and columns and identifying the peaks. Knowing the sequence of signaling frequencies, the detector can establish a row of origination. The same procedure can be used to find the column of origination. Again, the intersection of the row and column of origination defines the origin. Note that the detector may perform the process of identifying these peaks as part of the process of determining the rotation angle.

Note that if the embedder inserts an FSK watermark in each row (or column) at the same phase offset and signaling frequencies, artifacts will be noticeable. Thus, it is advantageous to vary the phase offset and/or signaling frequencies across rows (or columns) to improve image fidelity. Also, it is advantageous to use different signaling frequencies in the rows and columns.

Yet another attribute is a sequence of known bits appended to the watermark. The detector may then search for these known bits, after adjusting for rotation and scale. To search, the detector invokes a reader to extract a message from the rows and columns. It then looks for the known bits to identify the row and column of origination.

3.4 Reading the FSK Watermark

If a watermark is detected, the reader extracts the watermark information signal from the image data (optionally by first re-orienting the data based on the orientation parameters). FIG. 5 is flow diagram illustrating a process of extracting a message from re-oriented image data 500.

Once orientation is established, the detector invokes the reader on the rows and columns. For the rows, the reader scans the input image row of interest into two independent channels (502), each of which is band-pass filtered at one of the two possible FSK frequencies (504). Then, for a given bit location, the reader decides that the bit is a zero if there is more energy in the output channel of the lower frequency filter (506). The reader decides that the bit is a one if there is more energy in the higher frequency filter (506). An exemplary implementation embeds on the order of four pixels per bit at 100 dpi, or 40 bits per inch. In general, with more pixels per bit, the individual decisions on the bits will be more reliable. As is known from the assignee's prior art, redundant signaling would be used here as well.

The reader converts the bit value to a corresponding raw bit value and buffers the value for the associated raw bit (508). In particular, if the message has been spread spectrum modulated, then the reader performs an inverse of the modulation operation to recover a candidate value for a corresponding raw bit and buffers the candidate value. In this reading process, the reader uses the assignment map to map the extracted candidate value to its corresponding raw bit position.

Next, the reader compiles the candidate values for each raw bit to compute a final value for each raw bit position (510). It compiles the candidates for the raw bits extracted from each of the tows. For a given raw bit, if more candidates are a one, then the final value is set to a one (and vice versa if more candidates are a zero). Finally, it performs error correction decoding to reconstruct the original message (512).

To extend to reading in the other dimension, one may use a similar approach. One could either embed the same bit at identical locations in both directions, or embed directionally dependent information. In the former case, the reader can achieve a more accurate message recovery by combining candidates from both rows and columns. In the latter, potentially more information would be embedded.

4.0 Embedding Multiple Watermarks

The self-orienting watermark described above may be embedded along with other watermarks into a host signal. For example, an FSK watermark may be combined with a spatial domain watermark, or other type of watermark inserted in another transform domain (e.g., wavelet, Discrete Cosine Transform, Discrete Fourier Transform domains). In such multi-watermark schemes, the self-orienting watermark may be used to establish orientation of other watermarks in the host signal. Before reading another watermark, the detector can mitigate the impact of interference due to the self-orienting watermark. For an FSK watermark, for example, the detector could apply a band-stop filter at the FSK signaling frequencies. This filtering operation would mitigate the interference due to the FSK signal when attempting to read other watermark messages.

5.0 Applications

There are many applications for self-orienting watermarks. The watermarks may carry data, machine instructions, and/or links to other data or instructions. The link may be implemented as an address or reference to a database or other resource located on the same device as the detector or on a remote device (e.g., a computer on the Internet). Whether stored within the message, or linked by the message, the data and/or machine instructions may be used to authenticate the host signal, monitor the host signal (e.g., broadcast monitoring), identify its owner, control copying of the host signal, provide additional information related to the host signal, etc.

6.0 Operating Environment for Computer Implementations

Figure 9:
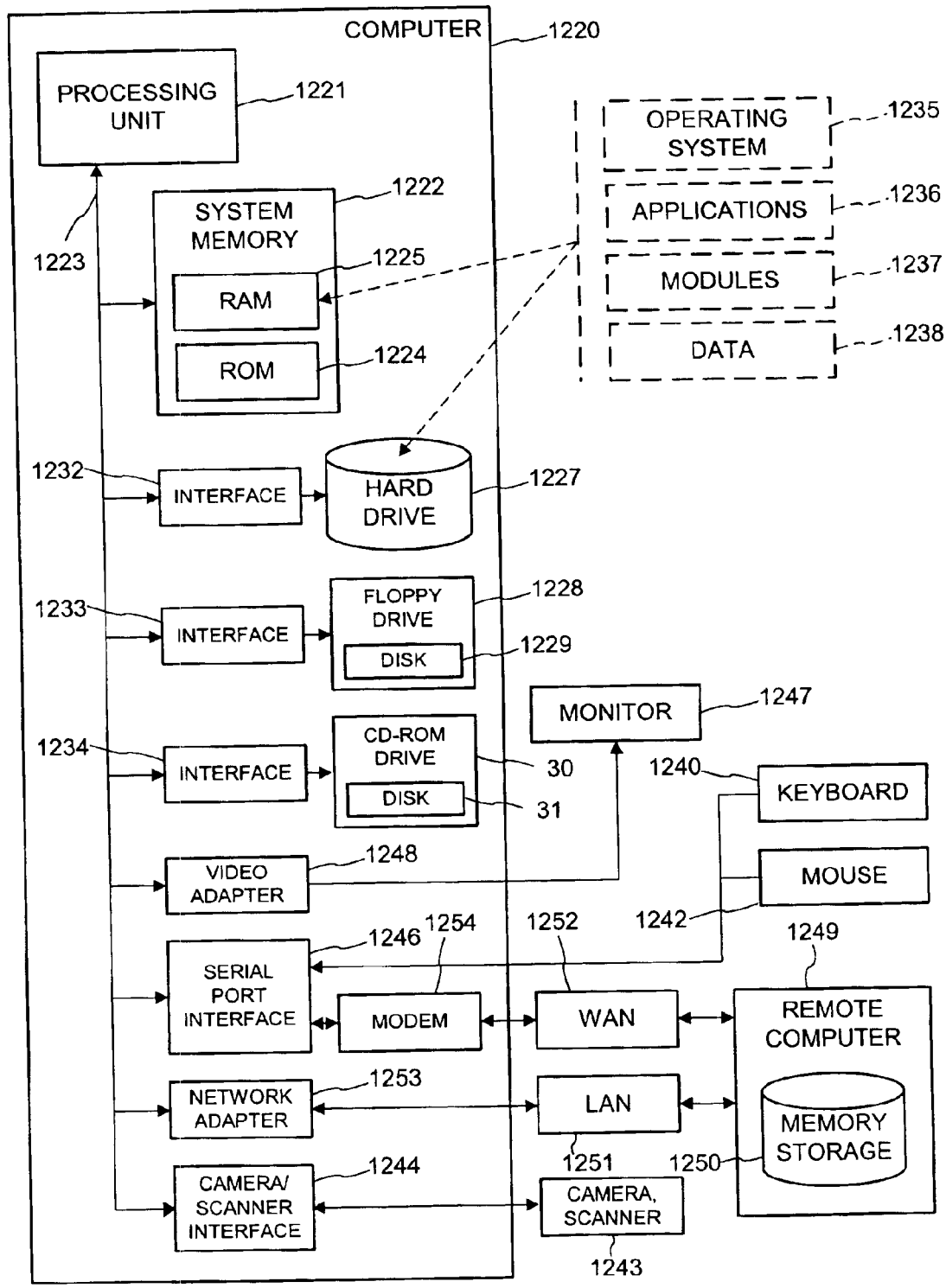
FIG. 9 illustrates an example of a computer system that serves as an operating environment for software implementations of watermarking systems described below.

FIG. 9 illustrates an example of a computer system that serves as an operating environment for software implementations of the watermarking systems described above. The embedder and detector implementations are implemented in C/C++ and are portable to many different computer systems. FIG. 9 generally depicts one such system.

The computer system shown in FIG. 9 includes a computer 1220, including a processing unit 1221, a system memory 1222, and a system bus 1223 that interconnects various system components including the system memory to the processing unit 1221.

The system bus may comprise any of several types of bus structures including a memory bus or memory controller, a peripheral bus, and a local bus using a bus architecture such as PCI, VESA, Microchannel (MCA), ISA and EISA, to name a few.

The system memory includes read only memory (ROM) 1224 and random access memory (RAM) 1225. A basic input/output system 1226 (BIOS), containing the basic routines that help to transfer information between elements within the computer 1220, such as during start-up, is stored in ROM 1224.

The computer 1220 further includes a hard disk drive 1227, a magnetic disk drive 1228, e.g., to read from or write to a removable disk 1229, and an optical disk drive 1230, e.g., for reading a CD-ROM or DVD disk 1231 or to read from or write to other optical media. The hard disk drive 1227, magnetic disk drive 1228, and optical disk drive 1230 are connected to the system bus 1223 by a hard disk drive interface 1232, a magnetic disk drive interface 1233, and an optical drive interface 1234, respectively. The drives and their associated computer-readable media provide nonvolatile storage of data, data structures, computer-executable instructions (program code such as dynamic link libraries, and executable files), etc. for the computer 1220.

Although the description of computer-readable media above refers to a hard disk, a removable magnetic disk and an optical disk, it can also include other types of media that are readable by a computer, such as magnetic cassettes, flash memory cards, digital video disks, and the like.

A number of program modules may be stored in the drives and RAM 1225, including an operating system 1235, one or more application programs 1236, other program modules 1237, and program data 1238.

A user may enter commands and information into the personal computer 1220 through a keyboard 1240 and pointing device, such as a mouse 1242. Other input devices may include a microphone, sound card, radio or television tuner, joystick, game pad, satellite dish, digital camera, scanner, or the like. A digital camera or scanner 43 may be used to capture the target image for the detection process described above. The camera and scanner are each connected to the computer via a standard interface 44. Currently, there are digital cameras designed to interface with a Universal Serial Bus (USB), Peripheral Component Interconnect (PCI), and parallel port interface. Two emerging standard peripheral interfaces for cameras include USB2 and 1394 (also known as firewire and iLink).

In addition to a camera or scanner, watermarked images or video may be provided from other sources, such as a packaged media devices (e.g., CD, DVD, flash memory, etc), streaming media from a network connection, television tuner, etc. Similarly, watermarked audio may be provided from packaged devices, streaming media, radio tuner, etc.

These and other input devices are often connected to the processing unit 1221 through a port interface 1246 that is coupled to the system bus, either directly or indirectly. Examples of such interfaces include a serial port, parallel port, game port or universal serial bus (USB).

A monitor 1247 or other type of display device is also connected to the system bus 1223 via an interface, such as a video adapter 1248. In addition to the monitor, personal computers typically include other peripheral output devices (not shown), such as speakers and printers.

The computer 1220 operates in a networked environment using logical connections to one or more remote computers, such as a remote computer 1249. The remote computer 1249 may be a server, a router, a peer device or other common network node, and typically includes many or all of the elements described relative to the computer 1220, although only a memory storage device 1250 has been illustrated in FIG. 9. The logical connections depicted in FIG. 9 include a local area network (LAN) 1251 and a wide area network (WAN) 1252. Such networking environments are commonplace in offices, enterprise-wide computer networks, intranets and the Internet.

When used in a LAN networking environment, the computer 1220 is connected to the local network 1251 through a network interface or adapter 1253. When used in a WAN networking environment, the personal computer 1220 typically includes a modem 1254 or other means for establishing communications over the wide area network 1252, such as the Internet. The modem 1254, which may be internal or external, is connected to the system bus 1223 via the serial port interface 1246.

In a networked environment, program modules depicted relative to the personal computer 1220, or portions of them, may be stored in the remote memory storage device. The processes detailed above can be implemented in a distributed fashion, and as parallel processes. It will be appreciated that the network connections shown are exemplary and that other means of establishing a communications link between the computers may be used.

7.0 Concluding Remarks

The watermarking technology detailed herein can be employed in numerous diverse applications. See, e.g., the applications for watermarking detailed in commonly-owned U.S. Pat. No. 5,862,260, and copending applications Ser. Nos. 09/292,569, 60/134,782, 09/343,104, 09/473,396, 09/476,686, and 60/141,763.

Having described and illustrated the principles of the invention with reference to a specific embodiment, it will be recognized that the principles thereof can be implemented in other, different, forms.

The particular combinations of elements and features in the above-detailed embodiments are exemplary only; the interchanging and substitution of these teachings with other teachings in this and the incorporated-by-reference patents/applications are also contemplated.

In view of the wide variety of embodiments to which the principles of the invention can be applied, it should be recognized that the detailed embodiment is illustrative only and should not be taken as limiting the scope of the invention. Rather, I claim as my invention all such embodiments as may come within the scope and spirit of the following claims, and equivalents thereto.

I claim:

1. A method of embedding a digital watermark in a host signal comprising:

converting a message into a digital watermark signal having an attribute that orients the watermark in the host signal, wherein said converting modulates the message using shift key modulation and the attribute is at least one frequency of the shift key modulated signal; and applying the watermark signal to the host signal.

2. The method of claim 1 wherein a message is encoded by converting symbols of the message into signals at selected FSK signaling frequencies.

3. The method of claim 1 wherein said converting includes modulating with a carrier that varies with the host signal.

4. The method of claim 1 wherein the digital watermark signal varies based on an extent to which selected host signal samples have a property consistent with the digital watermark to be embedded at the selected host signal samples.

5. A computer readable medium on which is stored instructions for executing the method of claim 1.

6. A method of embedding a digital watermark in audio comprising:

converting a message into a digital watermark signal having an attribute that orients the watermark in the audio, the converting encoding the message in a carrier, including using shift key modulation to form a modulated signal, and the attribute is spectral attribute of the modulated signal; and embedding the modulated signal in the audio by modifying the host according to the modulated signal.

7. The method of claim 6 wherein the modulated signal comprises a one dimensional signal that varies over a time dimension.

8. The method of claim 6 wherein the modulated signal is redundantly encoded in different parts of the audio.

9. The method of claim 6 wherein the watermark has two or more modulated signal components, each carrying a different message.

10. The method of claim 6 wherein the message is comprised of two or more symbols, and the symbols are converted to signals at a selected signaling frequency.

11. A method of embedding a digital watermark in a host signal comprising:

converting a message into a digital watermark signal having an attribute that orients the watermark in the host signal, wherein said converting modulates the message with shift key modulation and the attribute is a spectral property of the modulated signal; and applying the watermark signal to the host signal.

12. The method of claim 11 wherein the spectral property facilitates detection of the scale of the watermark in the host signal.

13. The method of claim 11 wherein the modulated signal has two or more components, each with a phase offset that facilitates detection of the position of the watermark in the host signal.

14. The method of claim 11 wherein the modulated signal has two or more components, each with a selected signaling frequency, the components being arranged in the host signal so that the signaling frequencies facilitate detection of the position of the watermark in the host signal.

15. A method of decoding a digital watermark in a host signal, wherein the watermark comprises a modulated signal, and wherein the watermark includes a message that is encoded by modulating symbols onto a carrier signal, said method comprising:

using a relationship of spectral attributes of the watermark to determine orientation of the watermark in a host signal, the spectral attributes being used to determine orientation and to carry a message; and decoding the watermark.

16. The method of claim 15 including:

reading a message encoded in the watermark.

17. The method of claim 15 wherein the attribute is a signaling frequency.

18. The method of claim 17 wherein the signaling frequency facilitates detection of scale of the watermark in the host signal.

19. The method of claim 15 wherein the host signal is an audio signal.

20. The method of claim 15 wherein modulating symbols on the carrier comprises shift key modulation.

* * * * *